US012609072B2

(12) United States Patent
Zhang

(10) Patent No.: US 12,609,072 B2
(45) Date of Patent: Apr. 21, 2026

(54) DISPLAY PANEL HAVING DUAL-MODE PIXEL CIRCUIT, AND DISPLAY DEVICE

(71) Applicant: XIAMEN TIANMA DISPLAY TECHNOLOGY CO., LTD., Xiamen (CN)

(72) Inventor: Yuheng Zhang, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/755,716

(22) Filed: Jun. 27, 2024

(65) Prior Publication Data

US 2024/0346992 A1 Oct. 17, 2024

(30) Foreign Application Priority Data

Jun. 30, 2023 (CN) ......................... 202310796556.5

(51) Int. Cl.
*G09G 3/32* (2016.01)

(52) U.S. Cl.
CPC ........... *G09G 3/32* (2013.01); *G09G 2310/08* (2013.01); *G09G 2320/0686* (2013.01)

(58) Field of Classification Search
CPC .... G09G 3/32–3291; G09G 2310/0243–0251; G09G 2310/04–067; G09G 2310/08; G09G 2320/0233; G09G 2320/0242–0252; G09G 2320/04; G09G 2320/06–062; G09G 2320/0693
See application file for complete search history.

(56) References Cited

U.S. PATENT DOCUMENTS

| | | | | |
|---|---|---|---|---|
| 2021/0035488 | A1* | 2/2021 | Seo | G09G 3/325 |
| 2022/0335872 | A1* | 10/2022 | Zhang | G09G 3/20 |
| 2023/0038629 | A1 | 2/2023 | Zhang | |
| 2023/0335045 | A1 | 10/2023 | Hu et al. | |

FOREIGN PATENT DOCUMENTS

| | | | | |
|---|---|---|---|---|
| CN | 113571000 | A | 10/2021 | |
| CN | 114420032 | A * | 4/2022 | G09G 3/20 |
| CN | 116189597 | A * | 5/2023 | G09G 3/32 |

OTHER PUBLICATIONS

English translation of CN-114420032-A (Year: 2022).*
English translation of CN 116189597 (Year: 2023).*
Office Action of Corresponding CN Patent Application No. 202310796556.5 dated Aug. 18, 2025.

* cited by examiner

*Primary Examiner* — Nathan Danielsen
(74) *Attorney, Agent, or Firm* — KILPATRICK TOWNSEND & STOCKTON LLP

(57) ABSTRACT

The present disclosure provides a display panel and a display device. A pixel circuit in the display panel is operable in any one of the first mode and the second mode. A duration Ld1 of a non-light-emitting period of a data writing frame in the first mode, a duration Lm1 of the non-light-emitting period of a holding frame in the first mode, a duration Ld2 of the non-light-emitting period of the data writing frame in the second mode, and a duration of the non-light-emitting period of the holding frame in the second mode are flexibly adjusted according to a relationship of Ld1>Ld2, and/or, Lm1>Lm2, and durations of the non-light-emitting periods in the data writing frame and the holding frame are optimized to ensure good display effects of the display panel in different modes.

19 Claims, 17 Drawing Sheets

DISPLAY PANEL HAVING DUAL-MODE PIXEL CIRCUIT, AND DISPLAY DEVICE

The present application claims priority to Chinese Patent Application No. 202310796556.5, titled "DISPLAY PANEL AND DISPLAY DEVICE", filed on Jun. 30, 2023 with the State Intellectual Property Office of People's Republic of China, which is incorporated herein by reference in its entirety.

FIELD

The present disclosure relates to the field of display technology, and in particular to a display panel and a display device.

BACKGROUND

A pixel circuit is configured to provide a driving current for a light-emitting element of a display panel for display, and control the light-emitting element to enter or not enter a light-emitting period, which is an indispensable component in most display panels. With the continuous development of science and technology, in order to meet a variety of needs of different application scenarios, how to realize a multi-functional display panel is a problem to be solved in the art.

SUMMARY

In view of this, in order to solve the above problems, the present disclosure provides a display panel and a display device, and the embodiment is as follows:

A display panel includes a pixel circuit and a light-emitting element, where the pixel circuit includes a driving module and a signal conditioning module; the driving module includes a driving transistor; a frame time of the display panel includes a non-light-emitting period and a light-emitting period, the non-light-emitting period includes a signal conditioning phase, and the signal conditioning module is configured to provide a preset signal for the driving transistor in the signal conditioning phase; an image refresh frame of the pixel circuit includes a data writing frame and a holding frame, the data writing frame includes p signal conditioning phases, $p \geq 1$, and/or, the holding frame includes q signal conditioning phases, $q \geq 0$; the pixel circuit is operable in any one of a first mode and a second mode; in the first mode, a duration of the non-light-emitting period of the data writing frame is Ld1, and a duration of the non-light-emitting period of the holding frame is Lm1; in the second mode, a duration of the non-light-emitting period of the data writing frame is Ld2, and a duration of the non-light-emitting period of the holding frame is Lm2; and Ld1>Ld2, and/or, Lm1>Lm2.

The present application also provides a display device, which includes the above-mentioned display panel.

BRIEF DESCRIPTION OF THE DRAWINGS

In order to more clearly illustrate the embodiments of the present disclosure or the conventional technology, the following will briefly introduce the drawings that need to be used in the description of the embodiments or the conventional technology. The accompanying drawings in the following description are only some embodiments of the present disclosure.

DETAILED DESCRIPTION OF EMBODIMENTS

The following will clearly and completely describe the embodiments of the present disclosure with reference to the accompanying drawings in the embodiments of the present disclosure. The described embodiments are only some, not all, embodiments of the present disclosure.

In order to make the embodiments of the present disclosure more comprehensible, the present disclosure will be further described in detail below in conjunction with the accompanying drawings and specific embodiments.

Figure 1:
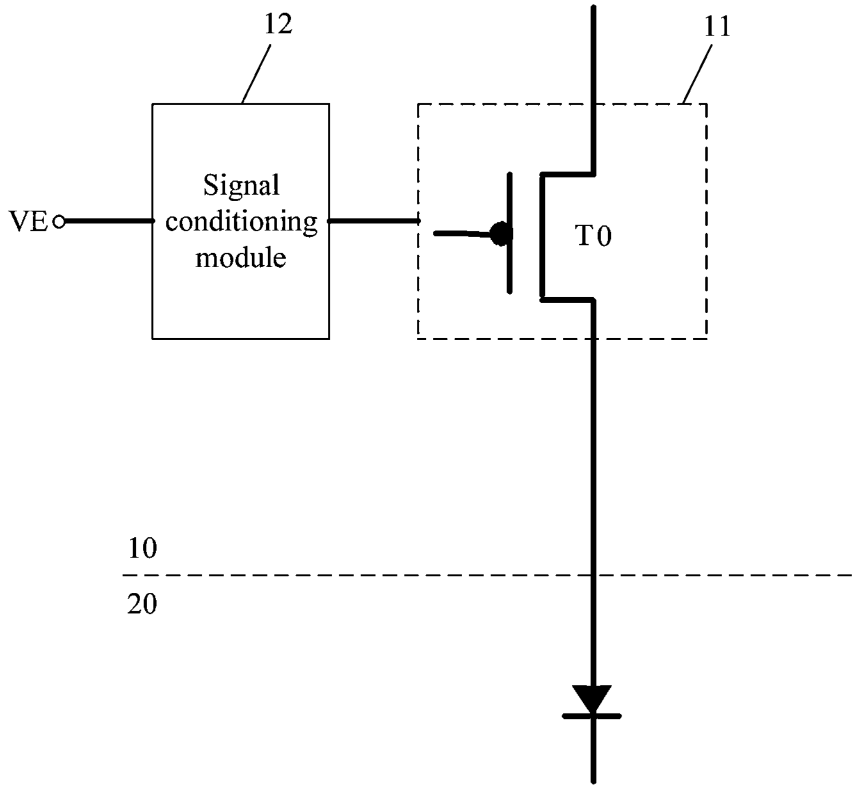
FIG. 1 is a schematic structural diagram of a pixel circuit provided by an embodiment of the present disclosure.

FIG. 1 is a schematic structural diagram of a pixel circuit provided by an embodiment of the present disclosure. The display panel provided by the embodiment of the present disclosure includes a pixel circuit 10 and a light-emitting element 20. The pixel circuit 10 includes a driving module 11 and a signal conditioning module 12. The driving module 11 is configured to provide a driving current for the light-emitting element 20. The light-emitting element 20 emits light in response to the driving current. The driving module 11 includes a driving transistor TO. It should be noted that the driving transistor TO may be a PMOS driving transistor, or other types of driving transistors such as an NMOS driving transistor. In the embodiment of the present disclosure, the driving transistor TO being a PMOS driving transistor is take as an example.

Figure 2:
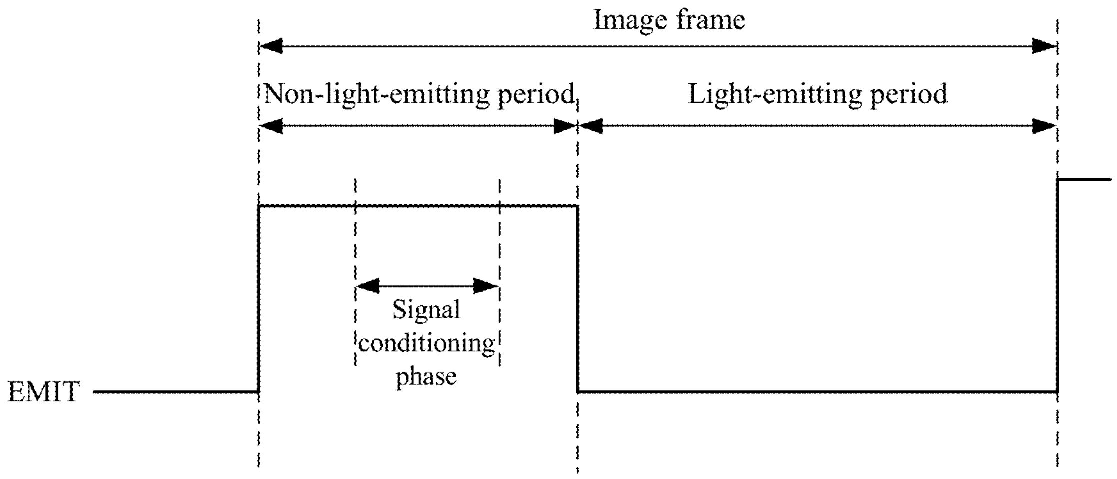
FIG. 2 is a partial timing diagram of a pixel circuit provided by an embodiment of the present disclosure.

FIG. 2 is a partial timing diagram of a pixel circuit operation provided by an embodiment of the present disclosure. A frame time of the display panel includes a non-light-emitting period and a light-emitting period, where the non-light-emitting period includes a signal conditioning phase. In the signal conditioning phase, the signal conditioning module 12 is configured to provide a preset signal VE for the driving transistor TO. That is, different signal adjustments are performed on the driving transistor TO in different signal conditioning phases in the non-light-emitting period, which can improve the stability of the driving transistor TO generating the driving current, and further improve the display effect of the display panel. It should be noted that, in FIG. 2, EMIT denotes a light emission control signal of the display panel.

Figure 3:
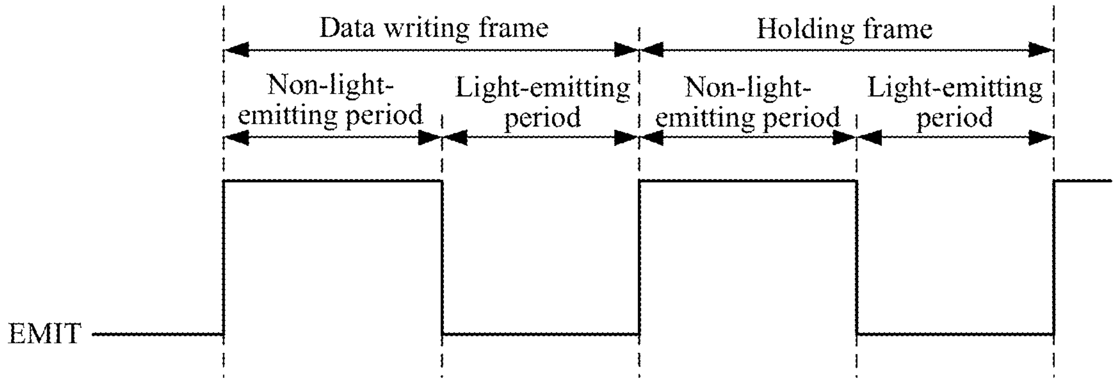
FIG. 3 is a partial timing diagram of another pixel circuit provided by an embodiment of the present disclosure.

FIG. 3 is a partial timing diagram of another pixel circuit operation provided by an embodiment of the present disclosure. An image refresh frame of the pixel circuit includes a data writing frame and a holding frame, where the data writing frame includes p signal conditioning phases, p≥1, and/or, the holding frame includes q signal conditioning phases, q≥0. That is, the numbers of the signal conditioning phases in the data writing frame and the holding frame are determined based on the types of the signal conditioning phases, which will be further explained below.

It should be noted that only one data writing frame and one holding frame are illustrated in FIG. 3, but the numbers of data writing frames and holding frames can be determined according to actual display requirements.

Figure 4:
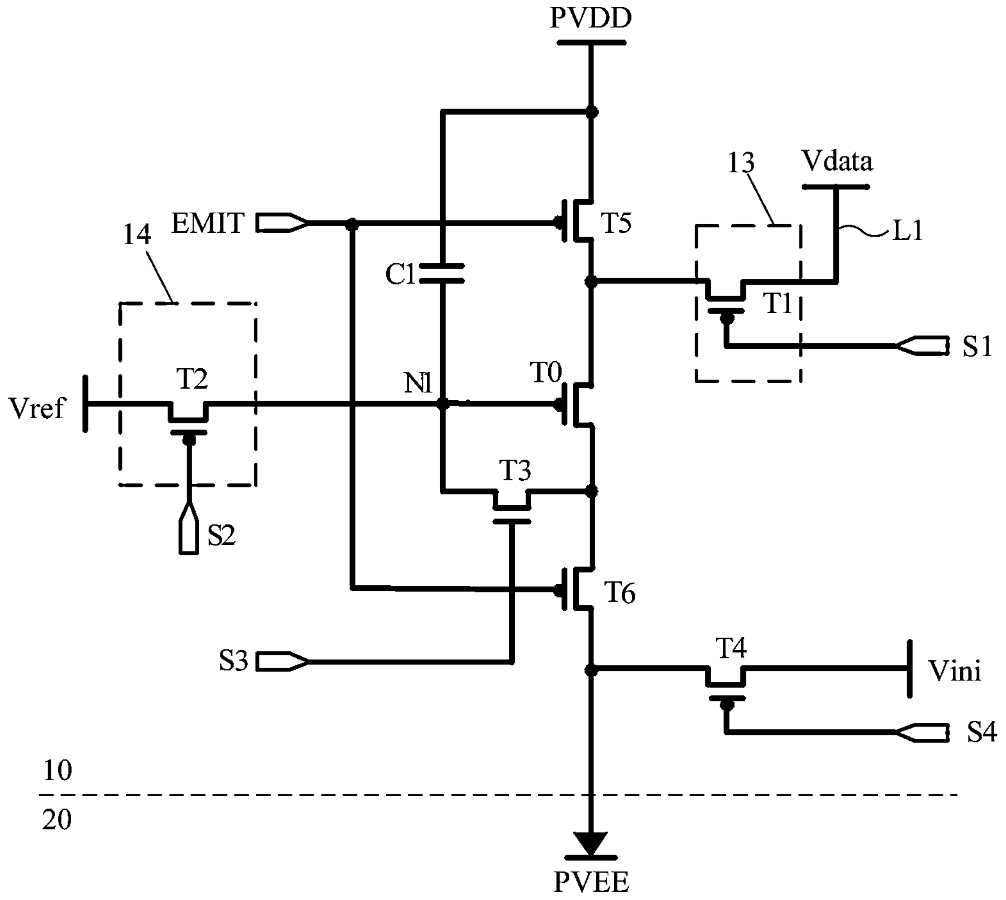
FIG. 4 is a schematic structural diagram of another pixel circuit provided by an embodiment of the present disclosure.

FIG. 4 is a schematic structural diagram of another pixel circuit provided by an embodiment of the present disclosure. In the pixel circuit 10 shown in FIG. 4, the driving transistor TO is a PMOS driving transistor, as an example for illustration. A drain electrode of the driving transistor TO is coupled to the light-emitting element 20, and provides a driving current for the light-emitting element 20 after the driving transistor TO is turned on.

As shown in FIG. 4, the pixel circuit 10 further includes a data writing module 13. In the embodiment of the present disclosure, the signal conditioning module 12 may be the data writing module 13. In this case, the preset signal VE output by the signal conditioning module 12 is a data signal Vdata, and the data writing module 13 is connected to a first electrode of the driving transistor TO. In the signal conditioning phase, that is, in a data writing phase, the data writing module 13 is turned on, and the data writing module 13 provides a data signal Vdata for the driving transistor TO.

That is, in the embodiment of the present disclosure, the signal conditioning includes providing the data signal Vdata for the driving transistor TO.

In some embodiments, the data writing module 13 includes a data writing transistor T1, where the data writing transistor T1 is connected between a source electrode of the driving transistor TO and a data signal line L1, a source electrode of the data writing transistor T1 is configured to receive the data signal Vdata, the drain electrode of the data writing transistor T1 is connected to the source electrode of the driving transistor TO, and the gate electrode of the data writing transistor T1 is configured to receive a control signal S1.

Figure 5:
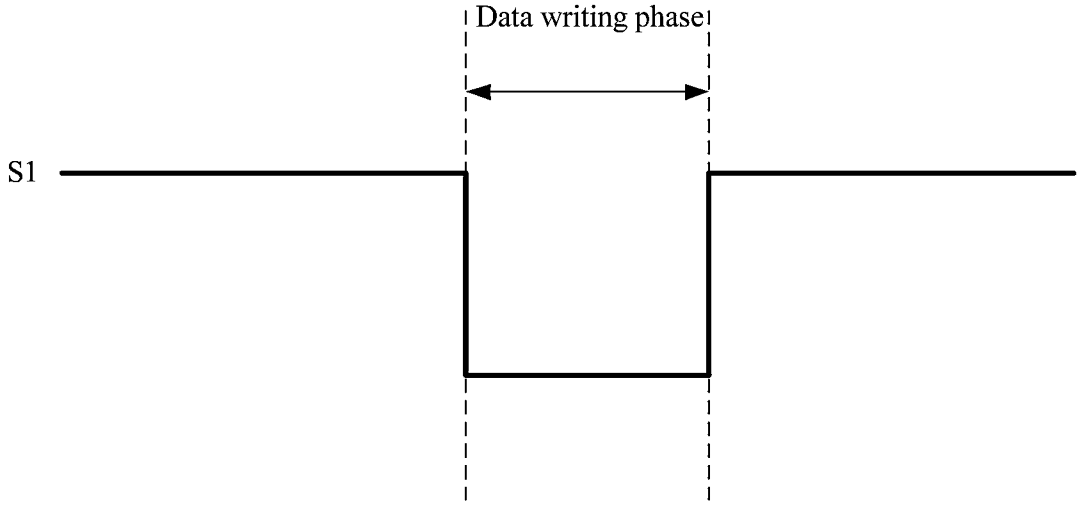
FIG. 5 is a partial timing diagram of another pixel circuit provided by an embodiment of the present disclosure.

FIG. 5 is a partial timing diagram of another pixel circuit provided by an embodiment of the present disclosure. The control signal S1 received by the data writing transistor T1 is a pulse signal. In the data writing phase, the control signal S1 is in a valid pulse phase and controls the data writing transistor T1 to be in the on state, to provide the data signal Vdata to the driving transistor TO through a data signal line L1. When the control signal S1 is in the invalid pulse phase, the control signal S1 controls the data writing transistor T1 to be in the off state. Therefore, under the control of the control signal S1, the data writing transistor T1 selectively provides the data signal Vdata to the driving transistor TO.

In an embodiment of the present disclosure, as shown in FIG. 4, the pixel circuit 10 further includes a reset module 14. In this embodiment of the present disclosure, the signal conditioning module 12 may be the reset module 14. In this case, the preset signal VE output by the signal conditioning module 12 is a reset signal Vref, the reset module 14 is connected to the gate electrode of the driving transistor T0. In the signal conditioning phase, that is, in the reset phase of the driving transistor T0, the reset module 14 is turned on, and the reset module 14 provides the reset signal Vref to the driver transistor T0.

That is, in the embodiment of the present disclosure, the signal conditioning includes providing the reset signal Vref for the driving transistor T0.

In one embodiment, the reset module 14 includes a first reset transistor T2, where the source electrode of the first reset transistor T2 receives the reset signal Vref, the drain electrode of the first reset transistor T2 is connected to the gate electrode of the driving transistor T0, and the gate electrode of the first reset transistor T2 is configured to receive the control signal S2.

The control signal S2 received by the first reset transistor T2 is a pulse signal, and when the control signal S2 is in a valid pulse phase, the control signal S2 controls the first reset transistor T2 to be in an on state, and the reset signal Vref is written into the driving transistor T0 through the first reset transistor T2 to reset the gate electrode of the driving transistor T0. When the control signal S2 is in an invalid pulse phase, the control signal S2 controls the first reset transistor T2 to be in an off state.

It should be noted that, when the signal conditioning module 12 is the data writing module 13 or the reset module 14, q=0. That is, when the signal conditioning module 12 is the data writing module 13 or the reset module 14, there is no signal conditioning phase in the holding frame. That is, the data writing phase and the reset phase for the driving transistor T0 are not included in the holding frame.

Figure 6:
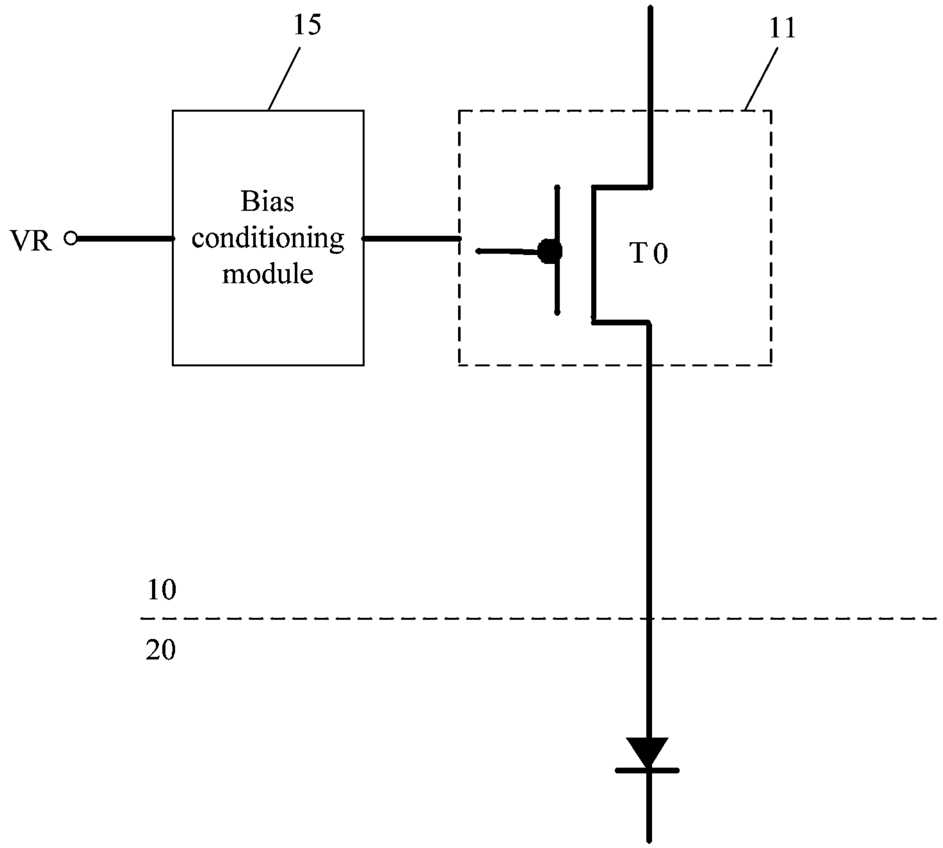
FIG. 6 is a schematic structural diagram of another pixel circuit provided by an embodiment of the present disclosure.

FIG. 6 is a schematic structural diagram of another pixel circuit provided by an embodiment of the present disclosure. The signal conditioning module 12 is a bias conditioning module 15, and the preset signal VE output by the signal conditioning module 12 is a bias conditioning signal VR.

The bias conditioning module 15 is connected to a first electrode or a second electrode of the driving transistor T0. During the signal conditioning phase, the bias conditioning module 15 is turned on, and the bias conditioning module 15 provides the bias conditioning signal VR for the driving transistor T0.

In some embodiments, with the time of using the pixel circuit 10, the characteristics of the driving transistor T0 in the pixel circuit 10 slowly change, causing a drift of the threshold voltage of the driving transistor T0, to affect the driving current generated by the driving transistor T0, and thus worsening display effect of the display panel.

For example, the display panel is switched from a driving mode of a high-frequency data refresh rate to a driving mode of a low-frequency data refresh rate. When the display panel displays in the driving mode of the high-frequency data refresh rate, within one data refresh cycle, the number of the holding frames is zero or very small, the gate electrode of the driving transistor T0 keeps the input of the data signal Vdata. That is, the gate potential of the driving transistor T0 is refreshed frequently. When the display panel displays in the driving mode of the low-frequency data refresh rate, within one data refresh cycle, the number of the holding frames becomes relatively large, and the gate potential of the driving transistor T0 remains unchanged for a long time in a data refresh cycle. When the pixel circuit 10 in the display panel is in the light-emitting period, the driving transistor T0 may work in a non-saturated state. For a PMOS driving transistor, the gate potential may be lower than the drain potential when the driving transistor T0 is turned on. For a NMOS driving transistor, the gate potential may be lower than the drain potential when the driving transistor is turned on. A long time of the above situation will cause the ion polarization inside the driving transistor, which forms an inner electric field in the driving transistor, causing continuous shift of the threshold voltage of the driving transistor.

Figure 7:
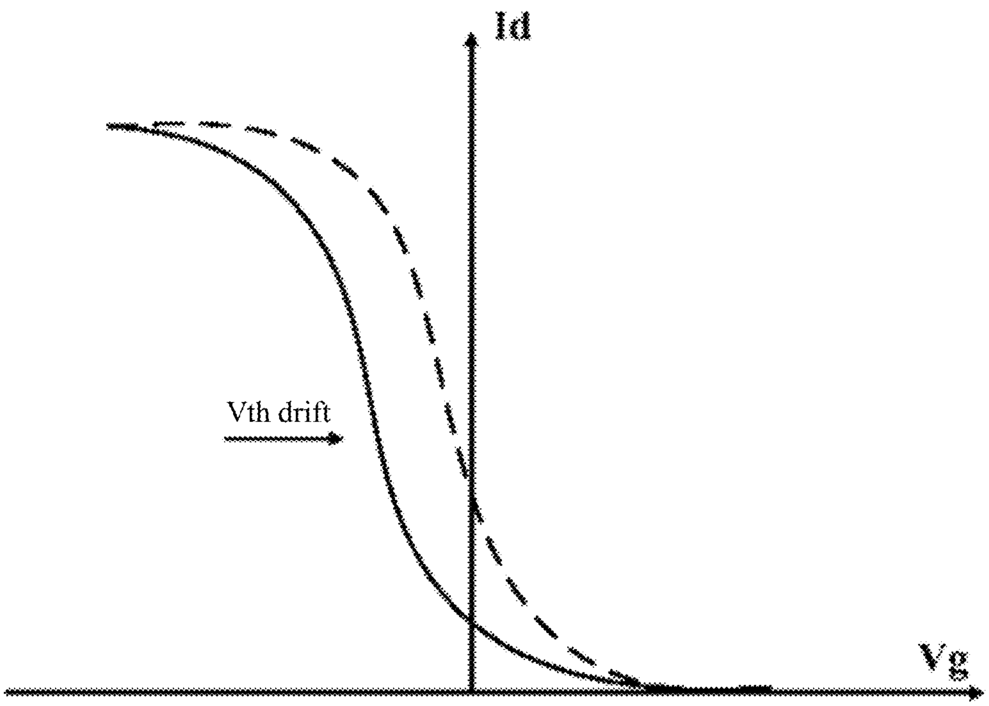
FIG. 7 is a schematic diagram of the Id-Vg curve drift of a driving transistor.

FIG. 7 is a schematic diagram of the drift of the Id-Vg curve of a driving transistor. As shown in FIG. 7, the Id-Vg curve shifts, which causes the shift of the threshold voltage Vth of the driving transistor, resulting in instability of the input signal of the driving transistor, affecting the generated driving current, and worsening the display effect of the display panel.

Therefore, by setting the bias conditioning module 15, in the signal conditioning phase, the bias conditioning signal VR is input to the first electrode or the second electrode of the driving transistor T0. That is, the bias conditioning signal VR is input to the source electrode or drain electrode of the driving transistor T0 to adjust the drain potential of the driving transistor T0, to adjust the potential difference between the gate potential and the drain potential of the driving transistor T0, to reduce the ion polarization inside the driving transistor T0, reducing the threshold voltage of the driving transistor T0, preventing the drift of the Id-Vg curve. Therefore, the driving current generated by the driving transistor T0 is not affected, to improve the display effect of the display panel.

It should be noted that, when the signal conditioning module 12 is the bias conditioning module 15, $q \geq 1$. That is, when the signal conditioning module 12 is a bias conditioning module 15, both the data writing frame and the holding frame can include the signal conditioning phase for bias adjustment of the driving transistor T0, realizing the adjustment of the threshold voltage of the driving transistor T0 to comprehensively improve the display effect of the display panel at each phase.

Figure 8:
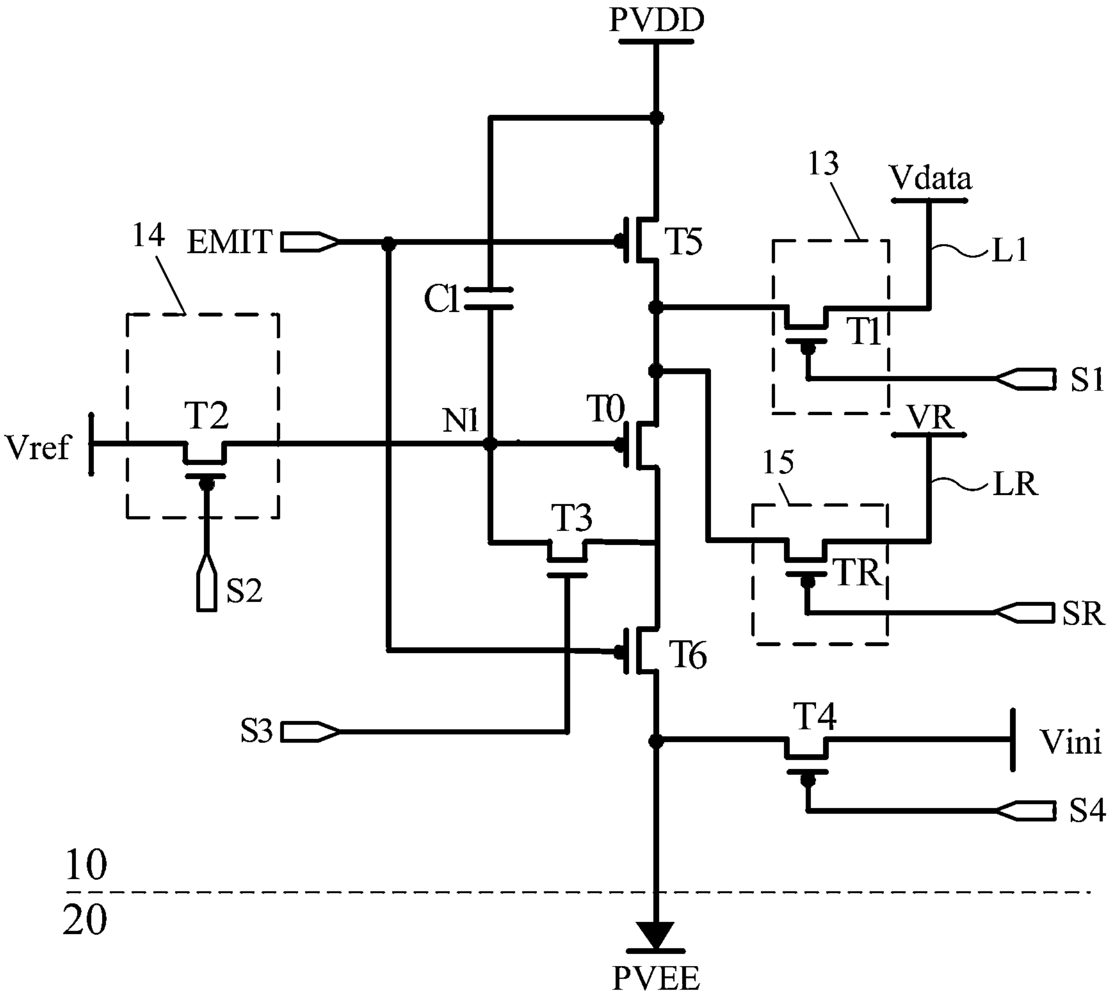
FIG. 8 is a schematic structural diagram of another pixel circuit provided by an embodiment of the present disclosure.

FIG. 8 is a schematic structural diagram of another pixel circuit provided by an embodiment of the present disclosure. In the pixel circuit 10 shown in FIG. 8, the driving transistor T0 is a PMOS driving transistor, as an example for illustration. The drain electrode of the driving transistor T0 is coupled to the light-emitting element 20, and provides a driving current for the light-emitting element 20 after the driving transistor T0 is turned on.

As shown in FIG. 8, the display panel provided by the embodiment of the present disclosure includes a data writing module 13 and a bias conditioning module 15.

The working process of the display panel includes a data writing phase and a signal conditioning phase.

In the data writing phase, the data writing module 13 is turned on, the bias conditioning module 15 is turned off, and the data writing module 13 provides the data signal Vdata for the driving transistor T0.

In the signal conditioning phase, the data writing module 13 is turned off, the bias conditioning module 15 is turned on, and the bias conditioning module 15 provides the bias conditioning signal VR for the driving transistor T0.

In some embodiments, as shown in FIG. 8, the data writing module 13 is connected to the data signal line L1, and the data signal line L1 is configured to transmit the data signal Vdata. The bias conditioning module 15 is connected to a bias conditioning signal line LR, and the bias conditioning signal line LR is configured to transmit the bias conditioning signal VR. The bias conditioning module 15 is controlled by the control signal SR. The bias conditioning module 15 includes a bias conditioning transistor TR, where the bias conditioning transistor TR is connected between the driving transistor T0 and the bias conditioning signal line LR, one electrode of the bias conditioning transistor TR is configured to receive the bias conditioning signal VR, another electrode of the bias conditioning transistor TR is connected to the source electrode or drain electrode of the driving transistor T0, and the gate electrode of the bias conditioning transistor TR is configured to receive the control signal SR. In the embodiment of the present disclosure, an example is described in which the bias conditioning transistor TR is connected to the source electrode of the driving transistor T0.

The control signal SR received by the bias conditioning transistor TR is a pulse signal. In the signal conditioning phase, the control signal SR is in the valid pulse phase to control the bias conditioning transistor TR to be in the on state, to provide a bias conditioning signal VR to the driving transistor T0 through the bias conditioning signal line LR.

Figure 9:
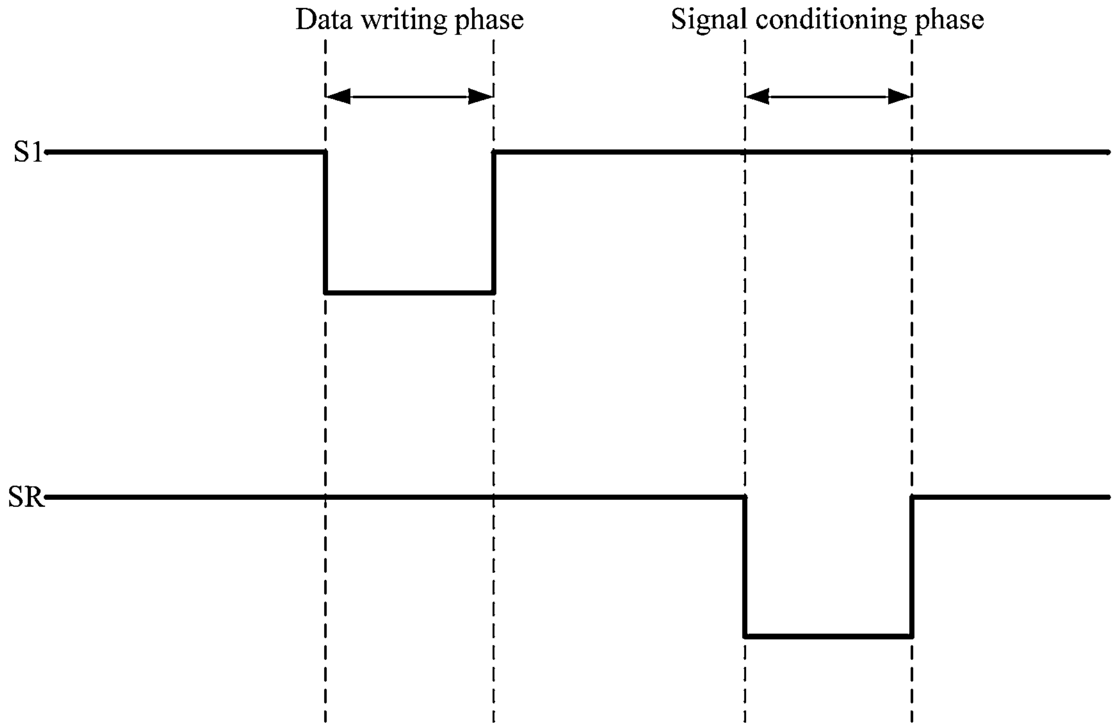
FIG. 9 is a partial timing diagram of another pixel circuit provided by an embodiment of the present disclosure.

FIG. 9 is a partial timing diagram of another pixel circuit operation provided by the embodiment of the present disclosure. In the data writing phase, the data writing module 13 is turned on, and the data signal Vdata is written into the gate electrode of the driving transistor T0 through the data signal line L1. In the signal conditioning phase, the bias conditioning module TR is turned on, and writes the bias conditioning signal VR to the drain electrode of the driving transistor T0 through the bias conditioning signal line LR.

In the embodiment of the present disclosure, by adding the bias conditioning module 15, it is beneficial to realize the separate control of the bias conditioning module 15 and the data writing module 13, and is beneficial to set the magnitude of the bias conditioning module VR separately without being restricted by the data signal Vdata, to achieve good display effects of the display panel under different display requirements.

In an embodiment of the present disclosure, based on the structure of the pixel circuit 10 shown in FIG. 4, the bias conditioning module 15 is reused as the data writing module 13. That is, the data writing module 13 not only provides the data signal Vdata, but also provides the bias conditioning signal VR.

Figure 10:
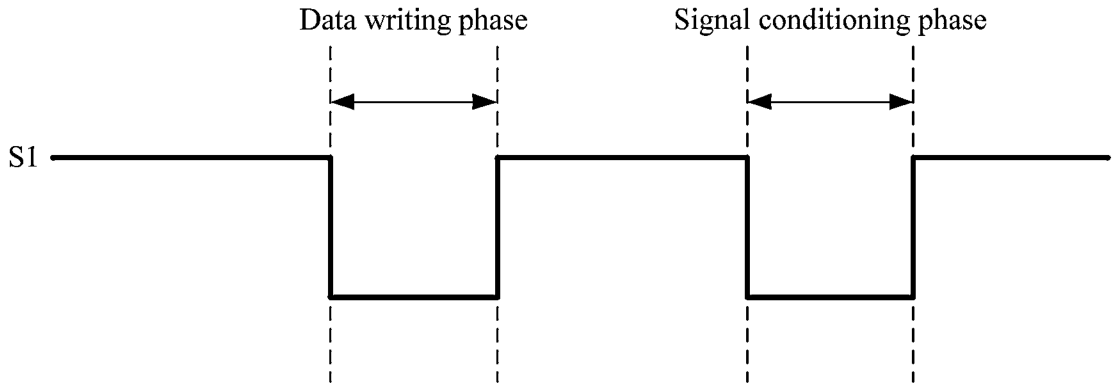
FIG. 10 is a partial timing diagram of another pixel circuit provided by an embodiment of the present disclosure.

FIG. 10 is a partial timing diagram of another pixel circuit operation provided by an embodiment of the present disclosure. The working process of the display panel provided by the embodiment of the present disclosure includes a data writing phase and a signal conditioning phase.

In the data writing phase, the bias conditioning module 15 is turned on, and the bias conditioning module 15 provides the data signal Vdata for the driving transistor T0.

That is, in the data writing phase, the data writing module 13 is turned on, and the data writing module 13 provides the data signal Vdata for the driving transistor T0.

In the signal conditioning phase, the bias conditioning module 15 is turned on, and the bias conditioning module 15 provides the bias conditioning signal VR for the driving transistor T0.

That is, in the signal conditioning phase, the data writing module 13 is turned on, and the data writing module 13 plays a same role as the bias conditioning module 15 at this time, providing the bias conditioning signal VR for the driving transistor T0.

In the embodiment of the present disclosure, instead of adding an additional bias conditioning module 15, the data writing module 13 is reused to realize the function of bias conditioning, leading to a simple structure, which is conducive to simplifying the panel structure and improving the resolution of the display panel.

In some embodiments, as shown in FIG. 4 and FIG. 8, the pixel circuit 10 may further include: a compensation transistor T3 configured to compensate the threshold voltage of the driving transistor T0, where the source electrode of the compensation transistor T3 is connected to the gate electrode of the driving transistor T0 to form a first node N1, the drain electrode of the compensation transistor T3 is connected to the drain electrode of the driving transistor T0, and the gate electrode of the compensation transistor T3 is configured to receive the control signal S3. The control signal S3 received by the compensation transistor T3 is a pulse signal. The control signal S3 in the valid pulse phase is configured to control the compensation transistor T3 to be in the on state to compensate the threshold voltage of the driving transistor T0, and the control signal S3 in the invalid pulse phase is configured to control the compensation transistor T3 to be in the off state. Therefore, under the control of the control signal S3, the compensation transistor T3 selectively compensates the threshold voltage of the driving transistor T0.

In the embodiment of the present disclosure, the compensation transistor T3 may be an oxide semiconductor transistor. The leakage current of the oxide semiconductor transistor is relatively smaller, to help to stabilize the potential of the driving transistor T0.

It should be noted that, in the data writing phase, when the data writing module 13 writes the data signal Vdata to the gate electrode of the driving transistor T0, the compensation transistor T3 also needs to be in the on state.

It should be further noted that in a case that the bias conditioning module 15 is reused as the data writing module 13, that is, in a case that the bias conditioning module 15 and the data writing module 13 are the same module, in the data writing phase, when the data writing module 13 writes the data signal Vdata to the gate electrode of the driving transistor T0, the compensation transistor T3 also needs to be in the on state. In the signal conditioning phase, when the data writing module 13 writes the bias conditioning signal VR to the source electrode of the driving transistor T0, the compensation transistor T3 needs to be in the off state.

In some embodiments, as shown in FIG. 4 and FIG. 8, the pixel circuit 10 may further include: a light-emitting element reset transistor T4, where a source electrode of the light-emitting element reset transistor T4 is configured to receive an initialization signal Vini, and a drain electrode of the light-emitting element reset transistor T4 is connected to the anode of the light-emitting element 20, and the gate electrode of the light-emitting element reset transistor T4 is configured to receive the control signal S4. The control signal S4 received by the light-emitting element reset transistor T4 is a pulse signal, and the control signal S4 in the valid pulse phase is configured to control the light-emitting element reset transistor T4 to be in the on state, and the initialization signal Vini is written into the anode of the light-emitting element 20 through the light-emitting element reset transistor T4 to initialize the light-emitting element 20. The control signal S4 in the invalid pulse phase is configured to control the light-emitting element reset transistor T4 to be in the off state.

In some embodiments, as shown in FIG. 4 and FIG. 8, the pixel circuit 10 may further include: a first light emission control transistor T5 and a second light emission control transistor T6, where the first light emission control transistor T5 is connected between a first power signal terminal PVDD and the source electrode of the driving transistor T0, and the second light emission control transistor T6 is connected between the drain electrode of the driving transistor T0 and the light-emitting element 20, for controlling the pixel circuit 10 to be in a light-emitting period or a non-light-emitting period.

The cathode of the light-emitting element 20 is connected to a second power signal terminal PVEE.

The gate electrodes of the first light emission control transistor T5 and the second light emission control transistor T6 both receive the light emission control signal EMIT. Under the control of the light emission control signal EMIT, the first light emission control transistor T5 and the second light emission control transistor T6 are in the on state or off state. The light emission control signal EMIT received by the gate electrodes of the first light mission control transistor T5 and the second light emission control transistor T6 is a pulse signal. In the light-emitting period, the light emission control signal EMIT outputs a valid pulse to control the first light emission control transistor T5 and the second light emission control transistor T6 to be in the on state, and the driving current provided by the driving transistor T0 flows into the light-emitting element 20 to control it to emit light. In the non-light-emitting period, the light emission control signal EMIT outputs an invalid pulse to control the first light emission control transistor T5 and the second light emission control transistor T5 to be in the off state, and the light-emitting element 20 does not emit light.

It should be noted that the light emission control signal EMIT provided by the embodiment of the present disclosure may be a single control signal controlling both the first light emission control transistor T5 and the second light emission control transistor T6. In one embodiment, the light emission control signal EMIT may be divided into two sub light emission control signals to control the light-emitting control transistors respectively, where the longer one of the durations of the invalid pulses in the two sub light emission control signals is the effective duration of the non-light-emitting period.

In some embodiments, as shown in FIG. 4 and FIG. 8, the pixel circuit 10 may further include a storage capacitor C1, where a first electrode plate of the storage capacitor C1 is connected to the first power signal terminal PVDD, and a second electrode plate of the storage capacitor C1 is connected to the first node N1.

It should be noted that, for the sake of simplicity, the timing diagrams in the present disclosure only shows the timing processes related to the embodiments of the present disclosure, and the timing processes of other transistors are omitted here. It needs to be clear that the operation process of the pixel circuit 10 can be realized only when the timing processes of all transistors cooperate with each other.

Figure 11:
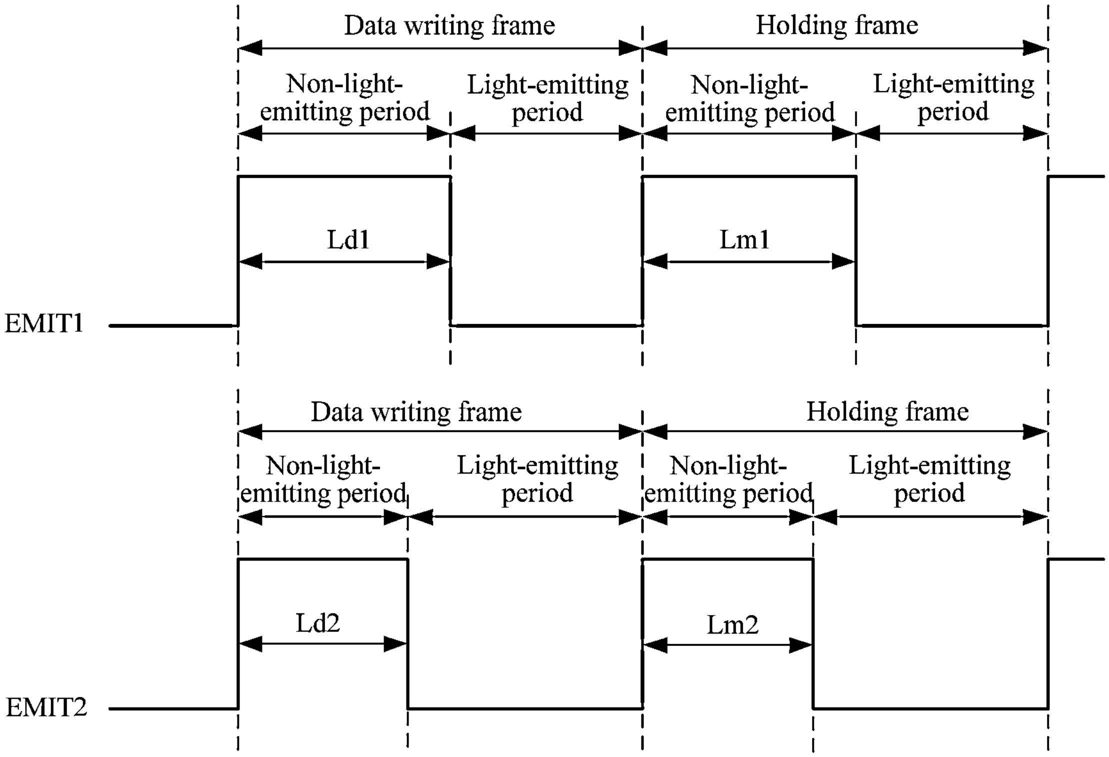
FIG. 11 is a partial timing diagram of another pixel circuit provided by an embodiment of the present disclosure.

FIG. 11 is a partial timing diagram of another pixel circuit operation provided by the embodiment of the present disclosure. The working process of the pixel circuit in the display panel provided by the embodiment of the present disclosure includes the first mode EMT1 and the second mode EMT2.

In the first mode EMT1, the duration of the non-light-emitting period of the data writing frame is Ld1, and the duration of the non-light-emitting period of the holding frame is Lm1.

In the second mode EMT2, the duration of the non-light-emitting period of the data writing frame is Ld2, and the duration of the non-light-emitting period of the holding frame is Lm2.

In the embodiment, Ld1>Ld2, and/or, Lm1>Lm2.

In some embodiments, there are at least two following schemes. In a first scheme, when the duration Ld1 of the non-light-emitting period of the data writing frame in the first mode EMT1 is greater than the duration Ld2 of the non-light-emitting period of the data writing frame in the second mode EMT2, the duration Lm1 of the non-light-emitting period of the holding frame in the first mode EMT1 is greater than the duration Lm2 of the non-light-emitting period of the holding frame in the second mode EMT2. In a second scheme, the duration Ld1 of the non-light-emitting period of the data writing frame in EMT1 is greater than the duration Ld2 of the non-light-emitting period of the data writing frame in the second mode EMT2, or the duration Lm1 of the non-light-emitting period of the holding frame in the first mode EMT1 is greater than the duration Lm2 of the non-light-emitting period of the holding frame in the second mode EMT2.

It should be noted that, in FIG. 11, Ld1>Ld2 and Lm1>Lm2 are illustrated as an example.

That is, the working process of the pixel circuit in the display panel provided by the embodiment of the present disclosure includes the first mode EMT1 and the second mode EMT2. According to a mode of Ld1>Ld2, and/or, Lm1>Lm2, the duration Ld1 of the non-light-emitting period of the data writing frame and the duration Lm1 of the non-light-emitting period of the holding frame in the first mode, and the duration Ld2 of the non-light-emitting period of the data writing frame and the duration Lm2 of the non-light-emitting period of the holding frame in the second mode are flexibly adjusted to optimize the durations of the non-light-emitting periods in the data writing frame and the holding frame, to ensure good display effects of the display panel in different modes, achieving a variety of display effects.

Furthermore, when the data writing frame and/or the holding frame include a signal conditioning phase, the signal conditioning phase is usually in the non-light-emitting period. Therefore, in the first mode EMT1 and the second mode EMT2, the duration of the non-light-emitting period of the data writing frame and/or the holding frame can be flexibly adjusted, and the available duration of the signal conditioning phase in different modes can also be further flexibly adjusted, to ensure the effectiveness of each signal conditioning phase and comprehensively improve the display effect of the display panel.

In an embodiment of the present disclosure, in the first mode EMT1, the luminance of the display panel is B1, and in the second mode EMT2, the luminance of the display panel is B2, where B1<B2.

The non-light-emitting period has different durations in different modes of luminance of the display panel. In the embodiment of the present disclosure, when B1<B2, Ld1>Ld2 and/or Lm1>Lm2.

The duration Ld1 of the non-light-emitting period of the data writing frame under the first mode EMIT1 is greater than the duration Ld2 of the non-light-emitting period of the data writing frame under the second mode EMIT2, and/or, the frame the duration Lm1 of the non-light-emitting period of the holding frame under the first mode EMIT1 is greater than the duration Lm2 of the non-light-emitting period of the holding frame under the second mode EMIT2. Therefore, for frames having the same or similar total duration of the non-light-emitting period and the light-emitting period, the duration of the light-emitting period under the first mode EMIT1 is less than the duration of the light-emitting period under the second mode EMIT2. That is, the duration of the light-emitting period of the data writing frame under the first mode EMIT1 is less than the duration of the light-emitting period of the data writing frame under the second mode EMIT2, and/or, the duration of the light-emitting period of the holding frame in the first mode EMIT1 is less than the duration of the light-emitting period of the holding frame in the second mode EMIT2. Therefore, the duration of the light-emitting period of each frame in the second mode EMIT2 is longer than that in the first mode EMIT1, resulting in a high total brightness of the entire screen observed by the human eye under the second mode EMIT2. That is, B1<B2, showing that the display panel can switch between brightness modes by switching between the first mode EMIT1 and the second mode EMIT2.

It should be noted that the luminance B1 in the first mode EMIT1 and the luminance B2 in the second mode EMIT2 refer to the total brightness of the display screen finally presented in human eyes.

For example, in scenarios such as watching games, the display panel can be displayed in high brightness in the second mode EMT2, and in scenarios such as reading e-books, the display panel can be displayed in low brightness in the first mode EMT1. The display panel provided by the embodiment can provide different display effects in display modes of different brightness, to realize diversified display and meet actual application requirements.

In an embodiment of the present disclosure, in the first mode EMT1, the frame frequency of the image refresh frame of the display panel is Fv1, and in the second mode EMT2, the frame frequency of the image refresh frame of the display panel is Fv2, where Fv1<Fv2.

In the second mode EMT2, the frame frequency Fv2 of the image refresh frame of the display panel can be 120 Hz. In the first mode EMT1, the frame frequency Fv1 of the image refresh frame of the display panel can be 60 Hz or 30 Hz or 1 Hz. In the modes of different frame frequencies of the image refresh frame of the display panel, the duration of the non-light-emitting period is different. Generally when the frame frequency of the image refresh frame is relatively large, the duration of the non-light-emitting period in one frame is relatively short. When the frame frequency of the image refresh frame is relatively small, the duration of the non-light-emitting period in one frame is relatively long. In an embodiment, in the case of Fv1<Fv2, the condition Ld1>Ld2 and/or Lm1>Lm2 is met.

The display panel can have different display effects when the pixel circuits 10 work in different modes of refresh frame, to realize diversified display and meet actual application requirements.

In an embodiment of the present disclosure, in the first mode EMT1, the frame duration of the image refresh frame of the display panel is S1, and in the second mode EMT2, the frame duration of the image refresh frame of the display panel is S2, where S1>S2.

The display panel has different durations of the non-light-emitting period in different modes of frame duration of the image refresh frame. Generally, when the frame duration of the image refresh frame is relatively long, the duration of the corresponding non-light-emitting period in one frame is relatively long. When the frame duration of the image refresh frame is relatively small, the duration of the non-light-emitting period in one frame is relatively short. In an embodiment, in the case of S1>S2, the condition Ld1>Ld2 and/or Lm1>Lm2 is met.

That is, by adjusting the frame duration of the image refresh frame in different modes, the display panel can have different display effects, to realize diversified display and meet actual application requirements.

In an embodiment of the present disclosure, as shown in FIG. 11, Ld1=Lm1, and/or, Ld2=Lm2.

There are at least two following schemes in the embodiment of the present disclosure. In a first scheme, in the first mode EMT1, the duration Ld1 of the non-light-emitting period of the data writing frame is equal to the duration Lm1 of the non-light-emitting period of the holding frame, and under the second mode EMT2, the duration Ld2 of the non-light-emitting period of the data writing frame is equal to the duration Lm2 of the non-light-emitting period of the holding frame. In a second scheme, in the first mode EMT1, the duration Ld1 of the non-light-emitting period of the data writing frame is equal to the duration Lm1 of the non-light-emitting period of the holding frame, or, in the second mode EMT2, the duration Ld2 of the non-light-emitting period of the data writing frame is equal to the duration Lm2 of the non-light-emitting period of the holding frame. That is, in the case of Ld1=Lm1 and/or Ld2=Lm2, it shows that in the embodiment of the present disclosure, between different modes, the data writing frame and the holding frame have the same change in the duration of the non-light-emitting period. In terms of signal control, this design does not need to distinguish between the data writing frame and the holding frame, but only needs to adjust the effective duration of the timing without requiring a new pulse signal, which can simplify the control logic of the display panel.

It should be noted that, in FIG. 11, Ld1=Lm1 and Ld2=Lm2 are illustrated as an example.

In an embodiment of the present disclosure, Ld1≠Lm1, and/or, Ld2≠Lm2. That is, between different modes, the data writing frame and the holding frame have different changes in the duration of the non-light-emitting period.

There are substantial differences between the functions of the data writing frame and the holding frame in the display panel, and an important function of the data writing frame is data writing. That is, the data writing frame includes the data writing phase, and in order to ensure the stability of data writing, there may be other signal conditioning phases such as the reset phase of the driving transistor in the data writing frame. But there are no such restrictions in the holding frame, which does not include the data writing phase and the reset phase of the driving transistor. Therefore, based on the difference in the signal conditioning phase in the non-light-emitting period of the data writing frame and the holding frame, the duration of the non-light-emitting period of the data writing frame and the duration of the non-light-emitting period of the holding frame are unnecessary to be exactly the same, but can be flexibly adjusted based on the substantial signal conditioning phase.

Figure 12:
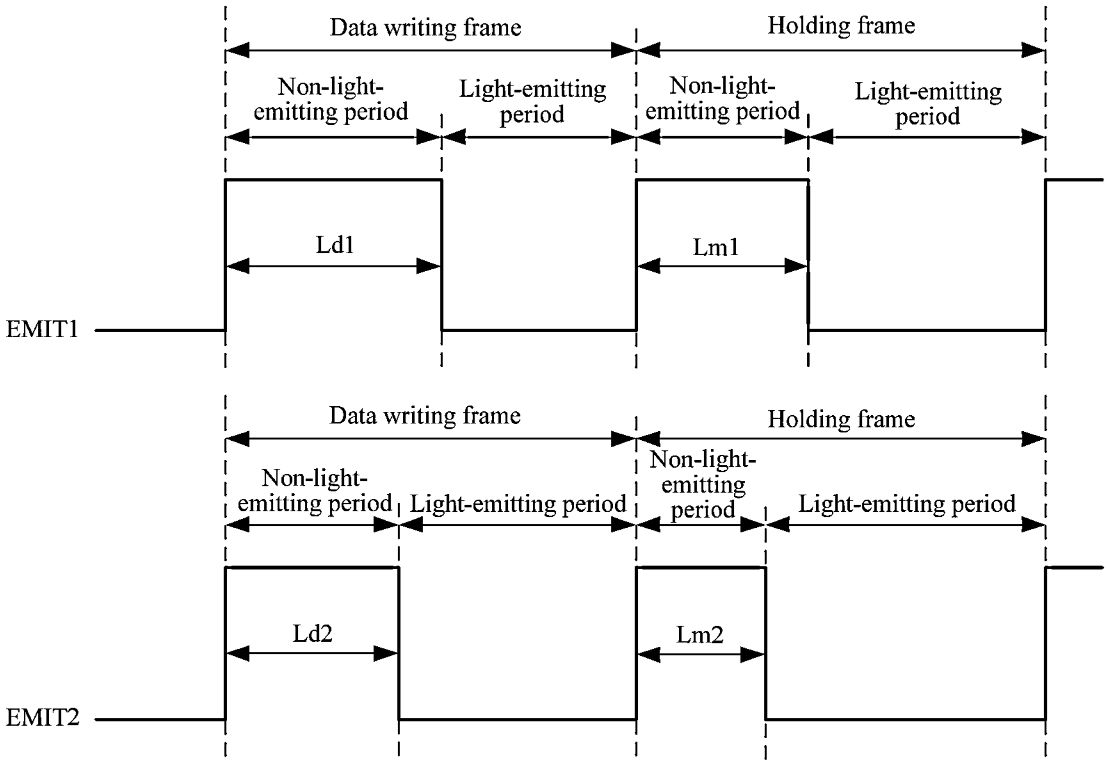
FIG. 12 is a partial timing diagram of another pixel circuit provided by an embodiment of the present disclosure.

FIG. 12 is a partial timing diagram of another pixel circuit operation provided by the embodiment of the present disclosure, where Ld1>Lm1 and/or Ld2>Lm2.

There are at least two following solutions in the embodiment of the present disclosure. In a first scheme, in the first mode EMT1, the duration Ld1 of the non-light-emitting period of the data writing frame is greater than the duration Lm1 of the non-light-emitting period of the holding frame, and in the second mode EMT2, the duration Ld2 of the non-light-emitting period of the data writing frame is greater than the duration Lm2 of the non-light-emitting period of the holding frame. In a second scheme, under the first mode EMT1, the duration Ld1 of the non-light-emitting period of the data writing frame is equal to the duration Lm1 of the non-light-emitting period of the holding frame, or, in the second mode EMT2, the duration Ld2 of the non-light-emitting period of the data writing frame is greater than the duration Lm2 of the non-light-emitting period of the holding frame.

A data refresh period includes a data writing frame and a holding frame. In the case of requiring a very high luminance or a high frame refresh frequency, even if the duration of the non-light-emitting period is very short, it is still necessary to have a relatively long duration of the non-light-emitting period in the data writing frame in order to ensure the effectiveness of the data writing phase in the data writing frame and the reset phase of the driving transistor. There are no such requirements for the holding frame, and it is acceptable to further shorten the duration of the non-light-emitting period of the holding frame.

In general, in the embodiment of the present disclosure, according to the functions of the data writing frame and the holding frame, and the difference in the signal conditioning phases contained in the data writing frame and the holding frame, the duration of the non-light-emitting period in the data writing frame and the holding frame can be adjusted separately, to optimize the durations of the non-light-emitting period in the data writing frame and the holding frame, to ensure that the display panel can achieve a good display effect in different modes.

It should be noted that, in FIG. 12, Ld1>Lm1 and Ld2>Lm2 are illustrated as an example.

Figure 13:
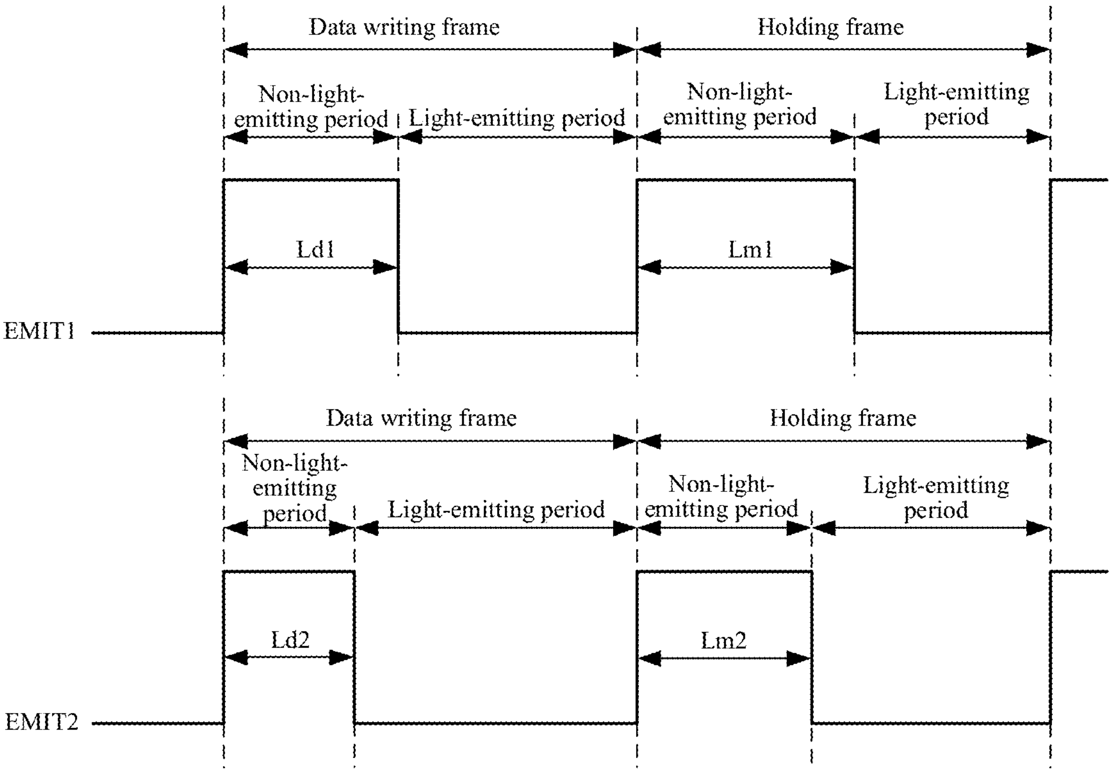
FIG. 13 is a partial timing diagram of another pixel circuit provided by an embodiment of the present disclosure.

In an embodiment of the present disclosure, referring to FIG. 13, which is a partial timing diagram of another pixel circuit operation provided by the embodiment of the present disclosure, Ld1<Lm1, and/or, Ld2<Lm2.

In the embodiment of the present disclosure, there are at least two following schemes. In a first scheme, in the first mode EMT1, the duration Ld1 of the non-light-emitting period of the data writing frame is less than the duration Lm1 of the non-light-emitting period of the holding frame, and under the second mode EMT2, the duration Ld2 of the non-light-emitting period of the data writing frame is less than the duration Lm2 of the non-light-emitting period of the holding frame. In a second scheme, under the first mode EMT1, the duration Ld1 of the non-light-emitting period of the data writing frame is less than the duration Lm1 of the non-light-emitting period of the holding frame, or, in the second mode EMT2, the duration Ld2 of the non-light-emitting period of the data writing frame is less than the duration Lm2 of the non-light-emitting period of the holding frame.

For some special functions in the display panel, the holding frame may include some special signal conditioning phases with a relatively long signal time, such as the above-mentioned phase of providing the bias conditioning signal VR for the driving transistor. In order to ensure the effectiveness of this signal conditioning phase in the holding frame, the duration of the non-light-emitting period in the holding frame also needs to be properly long. For example, in a case that both the data writing frame and the holding frame include a same signal conditioning phase, the duration of the signal conditioning phase in the data writing frame may be shortened or even canceled, which can be designed into the holding frame to extend the duration of the signal conditioning phase in the holding frame. In this case, the duration of the non-light-emitting period in the holding frame may be longer than the duration of the non-light-emitting period in the data writing frame, to meet some display requirements.

It should be noted that, in FIG. 13, $Ld1<Lm1$ and $Ld2<Lm2$ are illustrated as an example.

Figure 14:
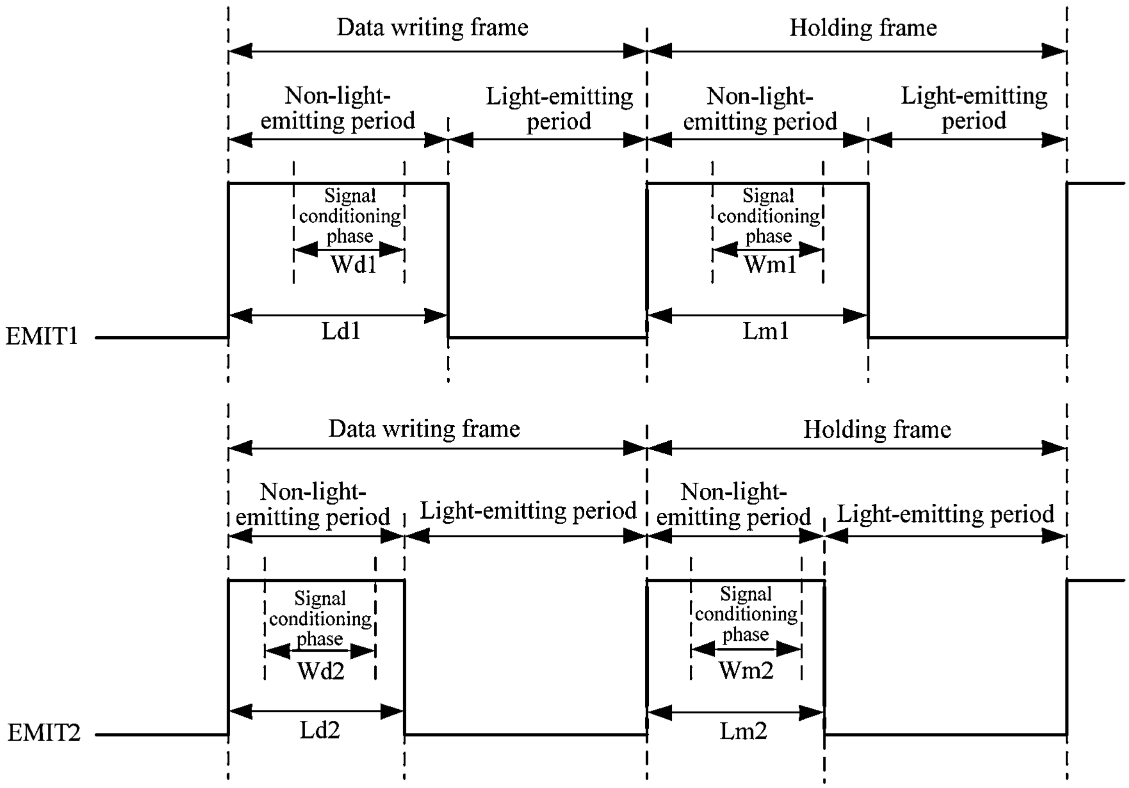
FIG. 14 is a partial timing diagram of another pixel circuit provided by the embodiment of the present disclosure.

FIG. 14 is a partial timing diagram of another pixel circuit operation provided by an embodiment of the present disclosure. In the first mode EMT1, the total duration of the signal conditioning phase in the data writing frame is Wd1, and the total duration of the signal conditioning phase in the holding frame is Wm1.

In the second mode EMT2, the total duration of the signal conditioning phase in the data writing frame is Wd2, and the total duration of the signal conditioning phase in the holding frame is Wm2.

In the embodiment, $Wd1/Ld1 \neq Wm1/Lm1$, and/or, $Wd2/Ld2 \neq Wm2/Lm2$.

It should be noted that, in the embodiment of the present disclosure, the number of the signal conditioning phases may be one or more, and only the parameter of the total duration of the signal conditioning phases is configured.

There are at least two following schemes in the embodiment of the present disclosure. In a first scheme, in the first mode EMT1, a ratio of the total duration Wd1 of the signal conditioning phase in the data writing frame to the duration Ld1 of the non-light-emitting period is not equal to a ratio of the total duration Wm1 of the signal conditioning phase in the holding frame to the duration Lm1 of the non-light-emitting period, and in the second mode EMT2, a ratio of the total duration Wd2 of the signal conditioning phase in the data writing frame to the duration Ld2 of the non-light-emitting period is not equal to a ratio of the total duration Wm2 of the signal conditioning phase in the holding frame to the duration Lm2 of the non-light-emitting period. In a second scheme, under the first mode EMT1, the ratio of the total duration Wd1 of the signal conditioning phase in the data writing frame to the duration Ld1 of the light-emitting period is not equal to the ratio of the total duration Wm1 of the signal conditioning phase in the holding frame to the duration Lm1 of the non-light-emitting period, or, in the second mode EMT2, a ratio of the total duration Wd2 of the signal conditioning phase of the data writing frame to the duration Ld2 of the non-light-emitting period is not equal to the ratio of the total duration Wm2 of the signal conditioning phase in the holding frame to the duration Lm2 of the non-light-emitting period.

That is, in at least one of the two modes, the ratio of the total duration of the signal conditioning phase to the duration of the non-light-emitting period in the data writing frame is not equal to that in the holding frame. The reason mainly lies in the difference in the signal conditioning phases in the data writing frame and the holding frame. On one hand, the types of the signal conditioning phases in the data writing frame and the holding frame are different. For example, the data writing frame can include a data conditioning phase for data writing, but the holding frame does not include the signal conditioning phase for data writing. On the other hand, even if the data writing frame and the holding frame include a same type of signal conditioning phase, such as a phase of providing the bias conditioning signal VR for the driving transistor, the duration of the signal conditioning phase in the data writing frame is different from the duration of the signal conditioning phase in the holding frame. Therefore, in the embodiment of the present disclosure, $Wd1/Ld1 \neq Wm1/Lm1$, and/or, Wd2/Ld2 Wm2/Lm2. That is, in the embodiment of the present disclosure, according to the functions of the data writing frame and the holding frame, and the difference in the signal conditioning phases contained in the data writing frame and the holding frame, the duration of the non-light-emitting period in the data writing frame and the holding frame can be adjusted separately, to optimize the durations of the non-light-emitting periods in the data writing frame and the holding frame, to ensure that the display panel can achieve a good display effect in different modes.

In an embodiment of the present disclosure, $Wd1/Ld1>Wm1/Lm1$, and/or, $Wd2/Ld2>Wm2/Lm2$.

In at least one of the two modes, the data writing frame can include a data writing phase, a reset phase of the driving transistor, and a data conditioning phase of providing the bias conditioning signal VR for the driving transistor. In some cases, even if the holding frame includes a signal conditioning phase, there is only the phase of providing the bias conditioning signal VR for the driving transistor. In some cases, there is no signal conditioning phase in the holding frame. Therefore, in the embodiment of the present disclosure, $Wd1/Ld1>Wm1/Lm1$, and/or, $Wd2/Ld2>Wm2/Lm2$, and the display panel can realize the corresponding display requirements based on this relationship.

In an embodiment of the present disclosure, $Wd1/Ld1<Wm1/Lm1$, and/or, $Wd2/Ld2<Wm2/Lm2$.

In at least one of the two modes, for some special functions in the display panel, the holding frame may include some special signal conditioning phases with a relatively long signal time, such as the above-mentioned phase of providing the bias conditioning signal VR for the driving transistor. In order to ensure the effectiveness of this signal conditioning phase in the holding frame, the duration of the non-light-emitting period in the holding frame also needs to be properly long. For example, in a case that both the data writing frame and the holding frame include the signal conditioning phase, the duration of the signal conditioning phase in the data writing frame may be shortened or even canceled, which can be designed into the holding frame to extend the duration of the signal conditioning phase in the holding frame. Therefore, in the embodiment of the present disclosure, $Wd1/Ld1<Wm1/Lm1$, and/or, $Wd2/Ld2<Wm2/Lm2$, and the display panel can realize the corresponding display requirements based on this relationship.

In an embodiment of the present disclosure, $Wd1/Ld1=Wd2/Ld2$, and/or, $Wm1/Lm1=Wm2/Lm2$.

In the embodiment of the present disclosure, the ratio of the total duration of the signal conditioning phase in the data writing frame to the duration of the non-light-emitting period is equal in different modes, and/or, the ratio of the total duration of the signal conditioning phase in the holding frame to the duration of the non-light-emitting period is equal in different modes. That is, the embodiment of the present disclosure only compares the data writing frames in different modes and compares the holding frames in different modes, when the condition $Wd1/Ld1=Wd2/Ld2$ and/or $Wm1/Lm1=Wm2/Lm2$ is met, the total duration of the signal conditioning phase and the duration of the non-light-emitting period in the data writing frame and the holding frame in different modes can be adjusted uniformly instead of separate adjustments, which can greatly simplify the signal control logic.

In an embodiment of the present disclosure, $Wd1/Ld1 \neq Wd2/Ld2$, and/or, $Wm1/Lm1 \neq Wm2/Lm2$.

In the embodiment of the present disclosure, the ratio of the total duration of the signal conditioning phase in the data writing frame to the duration of the non-light-emitting period is not equal in different modes, and/or, the ratio of the total duration of the signal conditioning phase in the holding frame to the duration of the non-light-emitting period is not equal in different modes. That is, the total duration of the signal conditioning phase and the duration of the non-light-emitting period are set to change non-proportionally between different modes. For example, when switching from the first mode to the second mode, the duration of the non-light-emitting period is shortened. At this time, the total duration of the signal conditioning phase is adjusted according to $Wd1/Ld1 \neq Wd2/Ld2$, and/or $Wm1/Lm1 \neq Wm2/Lm2$, which can ensure that the total duration of the signal conditioning phase in each mode is optimal, to meet the signal adjustment requirements in different modes, and ensure that the display panel can have good display effects in different modes.

In an embodiment of the present disclosure, $Wd1/Ld1 < Wd2/Ld2$, and/or $Wm1/Lm1 < Wm2/Lm2$.

In the embodiment of the present disclosure, the ratio of the total duration of the signal conditioning phase in the data writing frame to the duration of the non-light-emitting period is not equal in different modes, and/or, the ratio of the total duration of the signal conditioning phase in the holding frame to the duration of the non-light-emitting period is not equal in different modes. That is, the total duration of the signal conditioning phase and the duration of the non-light-emitting period are set to change non-proportionally between different modes. For example, when switching from the first mode to the second mode, the duration of the non-light-emitting period is shortened. At this time, the total duration of the signal conditioning phase is adjusted according to $Wd1/Ld1 < Wd2/Ld2$, and/or, $Wm1/Lm1 < Wm2/Lm2$, which can make the total change of the duration of the signal conditioning phase caused by the mode switching is relatively small. That is, the total duration of the signal conditioning phase in the second mode EMT2 is relatively large, ensuring the effectiveness of the signal conditioning phase in the second mode EMT2. That is, the total duration of the signal conditioning phase in each mode is optimal, to meet the signal adjustment requirements in different modes, and ensure that the display panel can have good display effects in different modes.

It should be noted that in an embodiment of the present disclosure, there may be a relationship of $Wd1/Ld1 > Wd2/Ld2$, and/or, $Wm1/Lm1 > Wm2/Lm2$. Because $Ld1 > Ld2$, and/or, $Lm1 > Lm2$, that is, the duration of the non-light-emitting period of the first mode EMT1 is relatively long and the duration of the non-light-emitting period of the second mode EMT2 is relatively small, the total duration of the signal conditioning phase in the first mode EMT1 can be set relatively large, and the total duration of the signal conditioning phase in the second mode EMT2 can be set relatively small to ensure that the total duration of the signal conditioning phase in each mode is optimal, to meet the signal conditioning requirements of different modes, and ensure that the display panel can have good display effects in different modes.

Figure 15:
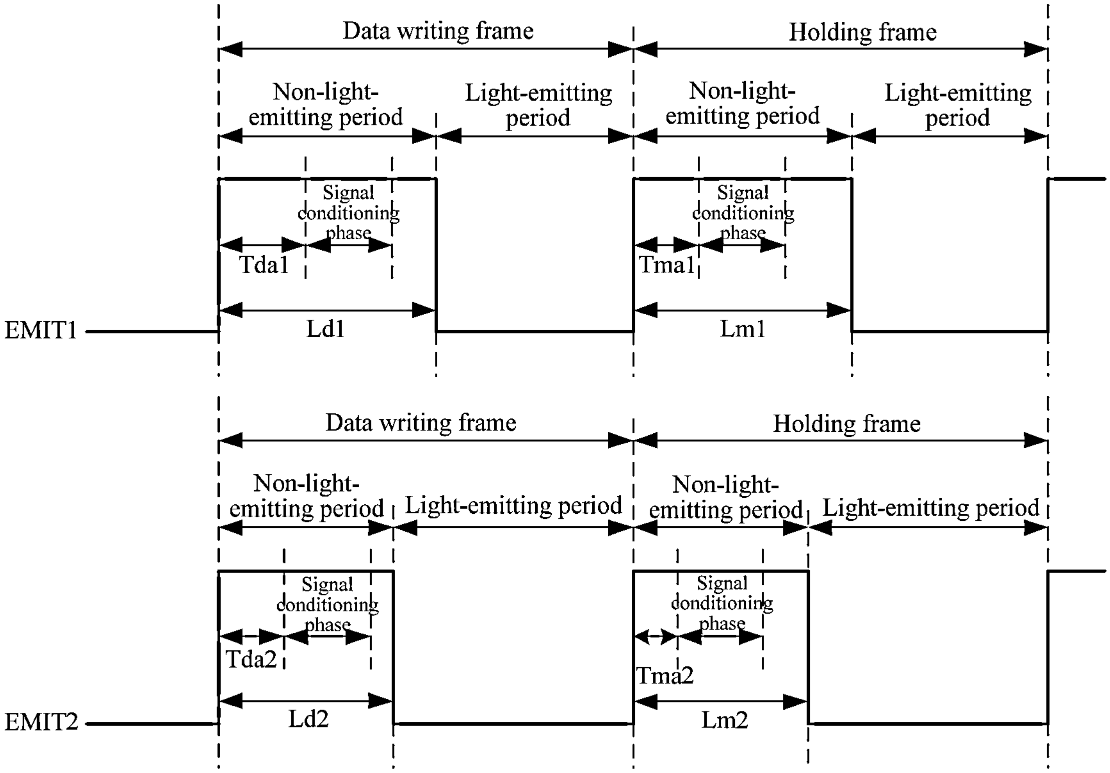
FIG. 15 is a partial timing diagram of another pixel circuit provided by an embodiment of the present disclosure.

FIG. 15 is a partial timing diagram of another pixel circuit operation provided by an embodiment of the present disclosure. In the first mode EMT1, in the data writing frame, the duration of the time period between the start of the non-light-emitting period and the start of the first signal conditioning phase is Tda1, and in the holding frame, the duration of the time period between the start of the non-light-emitting period and the start of the first signal conditioning phase is Tma1.

In the second mode EMT2, in the data writing frame, the duration of the time period between the start of the non-light-emitting period and the start of the first signal conditioning phase is Tda2, and the duration of the time period between the start of the non-light-emitting period and the start of the first signal conditioning phase is Tma2. In the embodiment, $Tda1 \neq Tma1$, and/or, $Tad2 \neq Tma2$.

In the embodiment of the present disclosure, in the data writing frame and the holding frame in the first mode EMT1 or in the second mode EMT2, the length of the time period between the start of the non-light-emitting period and the start of the first signal conditioning phase is adjusted, to realize the adjustment of the duration of the non-light-emitting period in the data writing frame and the holding frame in different modes. This is because after the start of the signal conditioning phase, the adjustment of the duration of the non-light-emitting period affects the duration of the signal conditioning phase. Therefore, Tda1, Tma1, Tad2, and Tma2 are adjusted before the signal conditioning phase, to avoid the adverse effects on the time of the signal conditioning phase, and ensure the display effects in different modes.

In any mode, based on the type of the signal conditioning phase in the data writing frame and the type of the signal conditioning phase in the holding frame, the length of the time period between the start of the non-light-emitting period and the start of the first signal conditioning phase can be flexibly set according to $Tda1 \neq Tma1$, and/or, $Tad2 \neq Tma2$ to ensure the effectiveness of the first signal conditioning phase when adjusting the duration of the non-light-emitting period, avoiding interference on the signal in the first signal conditioning phase and thus improving the display effect of the display panel.

In an embodiment of the present disclosure, $Tda1 < Tma1$, and/or, $Tda2 < Tma2$.

In any one of the first mode EMT1 and the second mode EMT2, when the duration of the non-light-emitting period is limited, the number of signal conditioning phases in the data writing frame is relatively large, while the number of signal conditioning phases in the holding frame is small. In order to ensure that the interval between the signal conditioning phases in the data writing frame can be reasonable to avoid signal interference between the various signal conditioning phases in the data writing frame, in the embodiment of the present disclosure, the length of the time period between the start of the non-light-emitting period and the start of the first signal conditioning phase is flexibly set according to $Tda1 < Tma1$ and/or $Tda2 < Tma2$, to ensure the effectiveness of each signal conditioning phase when adjusting the duration of the non-light-emitting period, thus improving the display effect of the display panel.

It should be noted that in an embodiment of the present disclosure, there may be a relationship of $Tda1 > Tma1$, and/or, $Tda2 > Tma2$, and in any mode of the first mode EMT1 and the second mode EMT2, the time period between the start of the non-light-emitting period in the data writing frame and the start of the first signal conditioning phase is long, to ensure the integrity and effectiveness of the first signal conditioning phase, avoiding interference on the signal in the first signal conditioning phase, and thus improving the display effect of the display panel.

In an embodiment of the present disclosure, $Tda1 = Tda2$, and/or, $Tma2 = Tma2$.

In the embodiment of the present disclosure, the between the start of the non-light-emitting period in the data writing frame and the start of the first signal conditioning phase is equal in different modes, and/or, the duration of the time period between the start of the light-emitting period in the holding frame and the start of the first signal conditioning phase is equal in different modes. That is, the embodiment of the present disclosure compares data writing frames in different modes and compares holding frames in different modes. When Tda1=Tda2, and/or, Tma2=Tma2, the durations of the time period between the start of the non-light-emitting phase and the start of the first signal conditioning phase in the data writing frame and the holding frame in different modes can be uniformly adjusted instead of separate adjustments, which can greatly simplify the signal control logic.

In an embodiment of the present disclosure, Tda1≠Tda2 and/or Tma1≠Tma2.

In the embodiment of the present disclosure, the duration of the time period between the start of the non-light-emitting period and the start of the first signal conditioning phase in the data writing frame is not equal in different modes, and/or, the duration of the time period between the start of the non-light-emitting period and the start of the first signal conditioning phase in the holding frame is not equal in different modes. That is, the duration of time period between the start of the non-light-emitting period and the start of the first signal conditioning phase is set to change non-proportionally in different modes. For example, when switching from the first mode to the second mode, the duration of the non-light-emitting period is shortened. At this time, the duration of the time period between the start of non-light-emitting period and the start of the first signal conditioning phase is adjusted according to Tda1≠Tda2, and/or Tma1 #Tma2, to meet the signal adjustment requirements in different modes and ensure that the display panel can have good display effects in different modes.

In an embodiment of the present disclosure, Tda1>Tda2 and/or Tma1>Tma2.

In the embodiment of the present disclosure, since Ld1>Ld2, and/or, Lm1>Lm2, that is, the duration of the non-light-emitting period in the first mode EMT1 is relatively long and the duration of the non-light-emitting period in the second mode EMT2 is relatively small, the duration of the time period between the start of the non-light-emitting period and the start of the first signal conditioning phase in the first mode EMT1 can be set relatively large, and the duration of the time period between the start of the non-light-emitting period and the start of the first signal conditioning phase in the second mode EMT2 can be set relatively small to ensure that the duration between the start of the non-light-emitting period and the start of the first signal conditioning phase in each mode is optimal, to meet the signal adjustment requirements in different modes, and ensure that the display panel can have good display effects in different modes.

It should be noted that in an embodiment of the present disclosure, there may be a relationship that Tda1<Tda2, and/or Tma1<Tma2. That is, in the embodiment of the present disclosure, Tda1, Tma1, Tad2, Tma2 can be reasonably set according to the actual display requirements, as well as the types and functions of the signal conditioning phases in the data writing frame and the holding frame, especially the type and function of the first signal conditioning phase, to ensure that the duration of the time period between the start of the non-light-emitting period and the start of the first signal conditioning phase in each mode is optimal, to meet the signal conditioning requirements in different modes, and ensure that the display panel can have good display effects in different modes.

Figure 16:
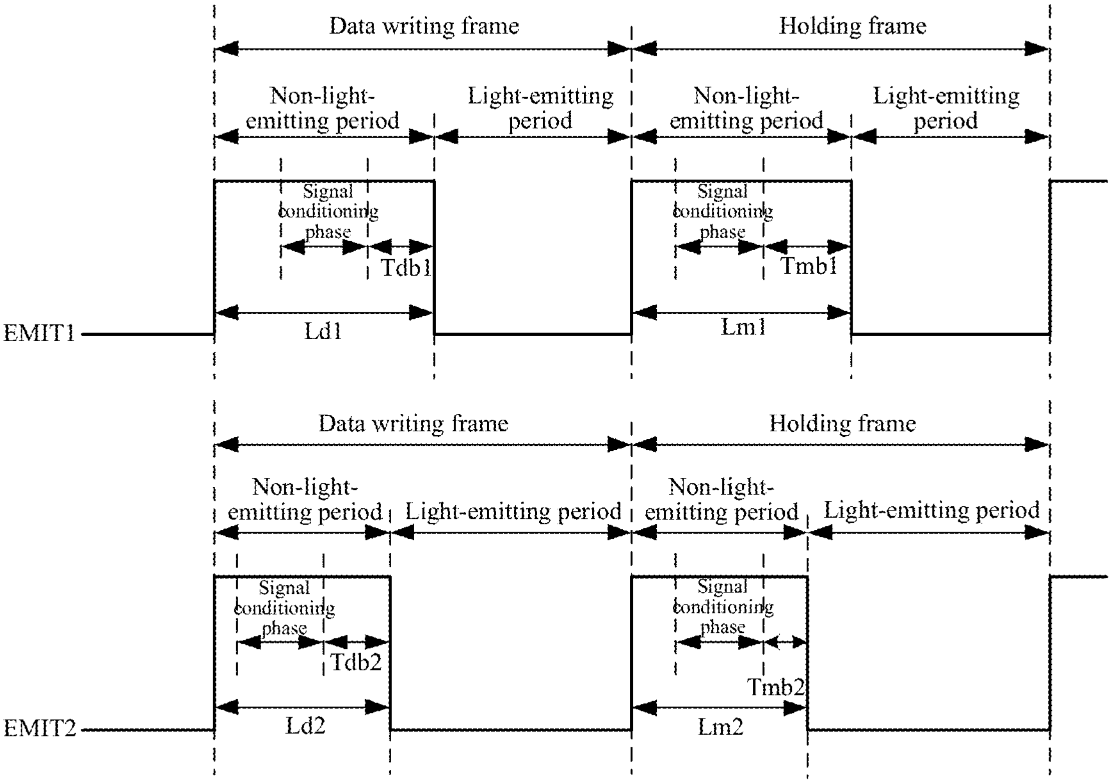
FIG. 16 is a partial timing diagram of another pixel circuit provided by an embodiment of the present disclosure.

FIG. 16 is a partial timing diagram of another pixel circuit operation provided by an embodiment of the present disclosure. In the first mode EMT1, in the data writing frame, the duration of the time period between the end of the last signal conditioning phase and the end of the non-light-emitting period is Tdb1, and the duration of the time period from the end of the last signal conditioning phase and the end of the non-light-emitting period in the holding frame is Tmb1.

In the second mode EMT2, in the data writing frame, the duration of the time period between the end of the last signal conditioning phase and the end of the non-light-emitting period is Tdb2, and the duration of the time period from the end of the last signal conditioning phase and the end of the non-light-emitting period in the holding frame is Tmb2.

In an embodiment, Tdb1≠Tmb1, and/or, Tdb2≠Tmb2.

In the embodiment of the present disclosure, no matter in the data writing frame and holding frame in the first mode EMT1, or in the data writing frame and holding frame in the second mode EMT2, the duration of the time period between the end of the last signal conditioning phase and the end of the non-light-emitting period is adjusted to realize the adjustment of the duration of the non-light-emitting period in the data writing frame and the holding frame in different modes. The adjusted pulse period does not involve the signal conditioning phase. Therefore, the Tdb1, Tmb1, Tdb2, and Tmb2 are adjusted after the last signal conditioning phase is over, to fully avoid adverse effects on the signal in the signal conditioning phase and ensure display effects in different modes.

In any mode, based on the type of the signal conditioning phase in the data writing frame and the type of the signal conditioning phase in the holding frame, the duration of the time period between the end of a signal conditioning phase and the end of the non-light-emitting period is flexibly set according to a relationship of Tdb1 #Tmb1, and/or, Tdb2 #Tmb2 to ensure the integrity and effectiveness of the last signal conditioning phase when adjusting the duration of the non-light-emitting period, avoiding interference on the signal in the last signal conditioning phase, and thus improving the display effect of the display panel.

In an embodiment of the present disclosure, Tdb1<Tmb1, and/or, Tdb2<Tmb2.

In any one of the first mode EMT1 and the second mode EMT2, when the duration of the non-light-emitting period is limited, the number of signal conditioning phases in the data writing frame is relatively large, while the number of signal conditioning phases in the holding frame is small. In order to ensure that the interval between the signal conditioning phases in the data writing frame can be reasonably, and to avoid signal interference between the various signal conditioning phases in the data writing frame, in the embodiment of the present disclosure, the duration of the time period between the end of the last signal conditioning phase and the end of the non-light-emitting period is flexibly set according to Tdb1<Tmb1, and/or, Tdb2<Tmb2, which can ensure the effectiveness of each signal conditioning phase when adjusting the duration of the time period of the non-light-emitting period, to improve the display effect of the display panel.

It should be noted that in an embodiment of the present disclosure, Tdb1>Tmb1, and/or, Tdb2>Tmb2. In any mode of the first mode EMT1 and the second mode EMT2, the duration of the time period between the end of the last signal conditioning phase in the data writing frame and the end of the non-light-emitting period is relatively long to ensure the integrity and effectiveness of the last signal conditioning phase, and avoid interference on the signal in the last signal conditioning phase, to improve the display effect of the display panel.

In an embodiment of the present disclosure, Tdb1=Tdb2, and/or, Tmb1=Tmb2.

In the embodiment of the present disclosure, the duration of the time period between the end of the last signal conditioning phase and the end of the non-light-emitting period in the data writing frame is equal in different modes, and/or, the duration of the time period between the end of the last signal conditioning phase and the end of the non-light-emitting period in the holding frame is equal in different modes. That is, the embodiment of the present disclosure compares data writing frames in different modes and compares holding frames in different modes. When the condition Tdb1=Tdb2 and/or Tmb1=Tmb2 is met, the duration of the time period between the end of the last signal conditioning phase and the end of the non-light-emitting period in the data writing frame and the holding frame in different modes can be uniformly adjusted instead of separate adjustments, which greatly simplifies the signal control logic.

In an embodiment of the present disclosure, Tdb1≠Tdb2, and/or, Tmb1≠Tmb2.

In the embodiment of the present disclosure, the duration of the time period between the end of the last signal conditioning phase and the end of the non-light-emitting period in the data writing frame is not equal in different modes, and/or, the duration of the time period between the end of the last signal conditioning phase and the end of the non-light-emitting period in the holding frame is not equal in different modes. That is, the duration of the time period between the end of the last signal conditioning phase and the end of the non-light-emitting period is set to change non-proportionally between different modes. For example, when switching from the first mode to the second mode, the duration of the non-light-emitting period is shortened. At this time, the duration of the time period between the end of the last signal conditioning phase and the end of non-light-emitting period is adjusted according to Tdb1≠Tdb2 and/or Tmb1≠Tmb2, to meet the signal adjustment requirements in different modes and ensure that the display panel can have good display effects in different modes.

In an embodiment of the present disclosure, Tdb1>Tdb2, and/or, Tmb1>Tmb2.

In the embodiment of the present disclosure, since Ld1>Ld2, and/or, Lm1>Lm2, that is, the duration of the non-light-emitting period in the first mode EMT1 is relatively long and the duration of the non-light-emitting period in the second mode EMT2 is relatively long, the duration of the time period between the end of the last signal conditioning phase and the end of the non-light-emitting period in the first mode EMT1 can be set relatively large, and the duration of the time period between the end of the last signal conditioning phase and the end of the non-light-emitting period in the second mode EMT2 can be set relatively small to ensure that the duration of the time period between the end of the last signal conditioning phase and the end of the non-light-emitting period in each mode is optimal, to satisfy the signal adjustment requirements in different modes, and ensure that the display panel can have good display effects in different modes.

It should be noted that in an embodiment of the present disclosure, Tdb1<Tdb2, and/or, Tmb1<Tmb2. That is, in the embodiment of the present disclosure, Tdb1, Tmb1, Tdb2, Tmb2 can be reasonably set according to the actual display requirements, as well as the types and functions of the signal conditioning phases in the data writing frame and the holding frame, especially the type and function of the last signal conditioning phase, to ensure that the duration of the time period between the end of the last signal conditioning phase and the end of the non-light-emitting period in each mode is optimal, to meet the signal adjustment requirements in different modes, and ensure that the display panel can have good display effects in different modes.

Figure 17:
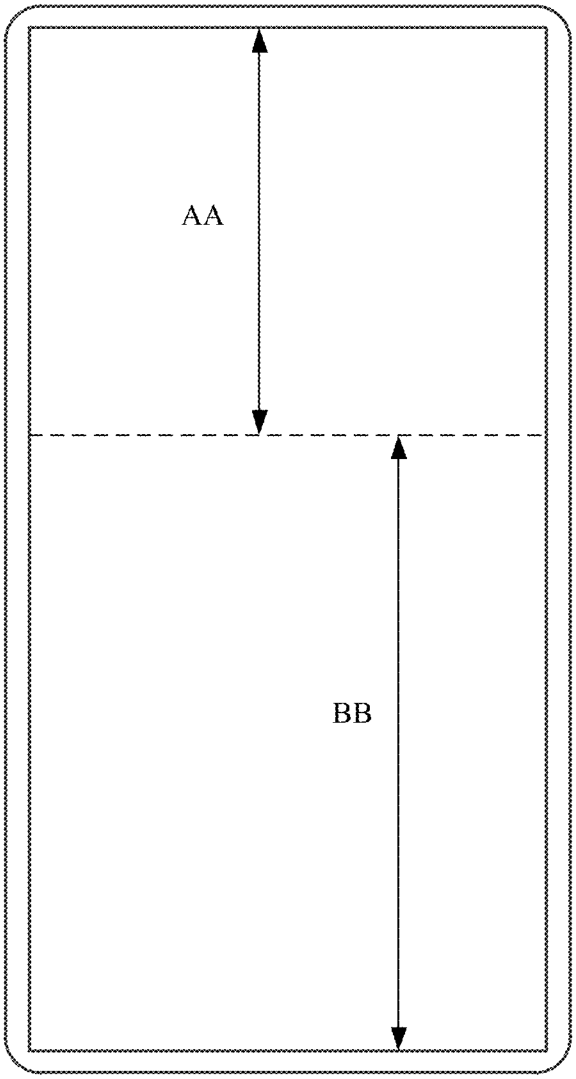
FIG. 17 is a schematic diagram of a display panel of a non-foldable screen provided by an embodiment of the present disclosure.
Figure 18:
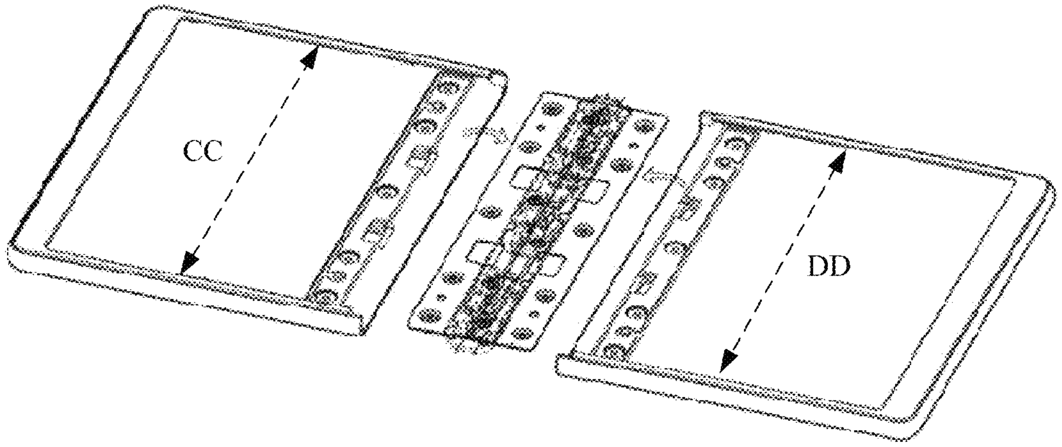
FIG. 18 is a schematic diagram of a display panel of a foldable screen provided by an embodiment of the present disclosure.

FIG. 17 is a schematic diagram of a display panel of a non-foldable screen provided by an embodiment of the present disclosure. FIG. 18 is a schematic diagram of a display panel of a foldable screen provided by an embodiment of the present disclosure. Each of the display panels includes a first pixel circuit and a second pixel circuit.

During at least a part of operation period of the display panel, the first pixel circuit works in the first mode, and the second pixel circuit works in the second mode.

The display panel includes a first display area and a second display area. For example, the first display area can be the AA area in FIG. 17, and the second display area can be the BB area in FIG. 17. For another example, the first display area can be the CC area, and the second display area can be the DD area in FIG. 18.

The first pixel circuit is located in the first display area, and the second pixel circuit is located in the second display area.

In an embodiment of the present disclosure, the first pixel circuit and the second pixel circuit are located in different display areas. For example, the first pixel circuit is located in the AA area in FIG. 17, and the second pixel circuit is located in the BB area in FIG. 17, or the first pixel circuit is located in the CC area in FIG. 18, and the second pixel circuit is located in the DD area in FIG. 18. During at least a part of the operation period of the display panel, the first pixel circuit works in the first mode while the second pixel circuit works in the second mode, and the AA area and BB area can achieve differential display within the same time period, or the CC area and DD area can achieve differential display within the same time period. For example in the same time period, a low-brightness display is performed in the area where the first pixel circuit is located, and a high-brightness display is performed in the area where the second pixel circuit is located. For example, the low-brightness display may be used to read an e-book, and the high-brightness display may be used to watch a sports event, to realize different display effects in different areas of the display panel.

It should be noted that the first mode and the second mode can be two modes with different luminance, or two modes with different frame frequencies of the image refresh frame. In an embodiment of the present disclosure, the first mode and the second mode are two display modes operating in two areas of the display panel at the same time.

Furthermore, in an embodiment of the present disclosure, the data refresh frequency of the first pixel circuit is Fs1, and the data refresh frequency of the second pixel circuit is Fs2, where Fs1≠Fs2.

In the embodiment of the present disclosure, the data refresh frequencies of the first pixel circuit and the second pixel circuit are different to each other. When the display panel operates in a driving mode with a high data refresh frequency, in a data refresh period, the number of the holding frames is zero or very small, and the gate electrode of the driving transistor T0 is continuously inputted with the data signal Vdata. That is, the gate potential of the driving transistor T0 is refreshed more frequently, and can perform high-brightness dynamic display. When the display panel operates in a driving mode with a low data refresh frequency, the number of the holding frames in a data refresh period is relatively large. In a data refresh period, the gate potential of the driving transistor T0 remains unchanged for a long time, and can perform low-brightness static display. Therefore, in the embodiment of the present disclosure, the data refresh frequencies of the first pixel circuit and the second pixel circuit are set to be different to each other, and the display panel can have different display effects in different areas.

In an embodiment of the present disclosure, $Fs1<Fs2$. The three parameters of the data refresh frequency, the luminance of the display panel and the frame frequency of the image refresh frame are usually positively correlated. That is, a high data refresh rate normally leads to a high luminance and a high frame frequency of the image refresh frame.

In should be noted here that, in an embodiment of the present disclosure, $Fs1>Fs2$. For example, under low-brightness display, a high data refresh frequency is still required to meet the some needs of users for some special display.

In an embodiment of the present disclosure, the operation period of the display panel includes a first time period and a second time period. In the first time period, the pixel circuits operates in the first mode, and in the second time period, the pixel circuits operates in the second mode.

In the embodiment of the present disclosure, the first mode and the second mode are two display modes operating in the same area of the display panel in different time periods. For example, high-brightness display is performed in the first time period, and low-brightness display is performed in the second time period.

Correspondingly, an embodiment of the present disclosure further provides a display device, including the display panel provided in any one of the above embodiments.

Figure 19:
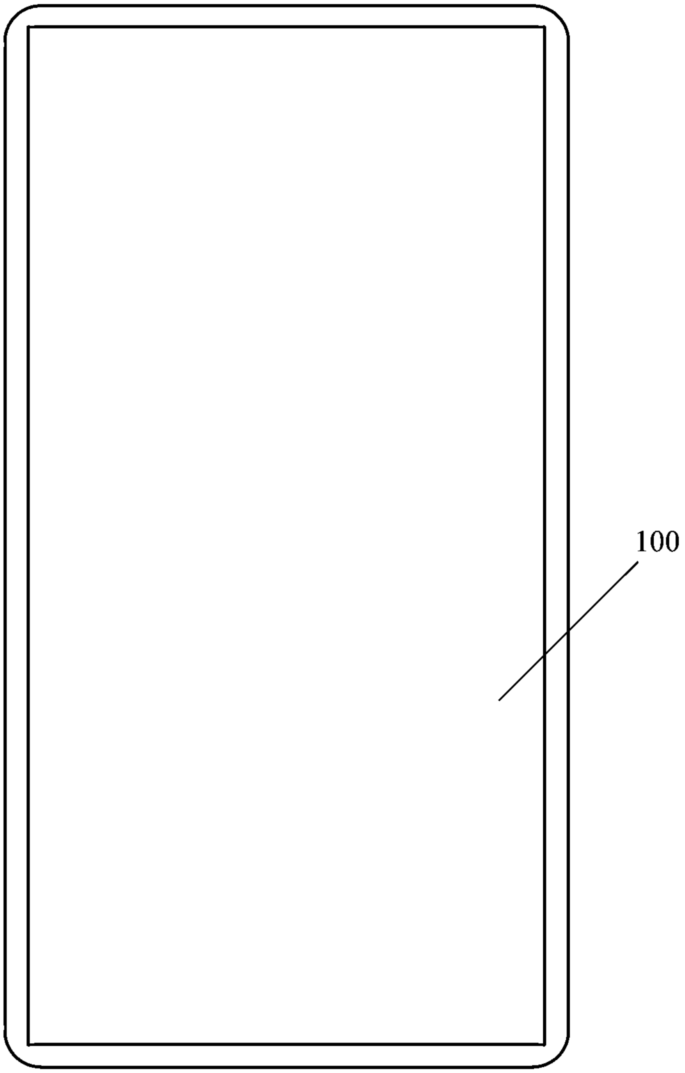
FIG. 19 is a schematic structural diagram of a display device provided by an embodiment of the present disclosure.

FIG. 19 is a schematic structural diagram of a display device provided by an embodiment of the present disclosure. The display device 1000 provided by the embodiment of the present disclosure may be a mobile terminal device.

In some other embodiments of the present disclosure, the display device may be an electronic display device such as a mobile phone, a computer, or a vehicle-mounted terminal, which is not specifically limited in the present disclosure.

The display panel and the display device provided by the present disclosure have been introduced in detail above. Specific examples are used to illustrate the principle and implementation of the present disclosure. The description of the above embodiments is only used to help understand the method of the present disclosure and the embodiments thereof. According to the embodiments of the present disclosure, there will be changes in the specific implementation and application scope. In summary, the content of this description should not be interpreted as limiting the present disclosure.

It should be noted that each embodiment in this specification is described in a progressive manner, and each embodiment focuses on the difference from other embodiments. The same and similar parts between the various embodiments can be referred to each other. As for the device disclosed in the embodiment, since it corresponds to the method disclosed in the embodiment, the description is relatively simple, and for the related part, one may refer to the description of the method.

It should also be noted that, relational terms such as first and second are only used to distinguish one entity or operation from another entity or operation, and do not necessarily require or imply that these entities or operations exists any such actual relationship or sequence. Furthermore, the term "comprises", "comprising" or any other variation thereof is intended to encompass a non-exclusive inclusion, including elements inherent in a process, method, article, or apparatus. Without further limitations, an element defined by the phrase "comprising a . . . " does not exclude the presence of additional identical elements in the process, method, article or apparatus including said element.

The invention claimed is:

1. A display panel, comprising:

a pixel circuit and a light-emitting element, wherein the pixel circuit comprises a driving module and a signal conditioning module;

the driving module comprises a driving transistor;

a frame time of the display panel comprises a non-light-emitting period and a light-emitting period, the non-light-emitting period comprises a signal conditioning phase, and the signal conditioning module is configured to provide a preset signal for the driving transistor in the signal conditioning phase;

an image refresh frame of the pixel circuit comprises a data writing frame and a holding frame, the data writing frame comprises p signal conditioning phases, $p \geq 1$, and/or, the holding frame comprises q signal conditioning phases, $q \geq 0$;

the pixel circuit is operable in any one of a first mode and a second mode;

in the first mode, a duration of the non-light-emitting period of the data writing frame is $Ld1$, and a duration of the non-light-emitting period of the holding frame is $Lm1$;

in the second mode, a duration of the non-light-emitting period of the data writing frame is $Ld2$, and a duration of the non-light-emitting period of the holding frame is $Lm2$;

wherein, $Ld1>Ld2$, and/or, $Lm1>Lm2$;

wherein in the first mode, in the data writing frame, a total duration of the p signal conditioning phases is $Wd1$, and in the holding frame, a total duration of the q signal conditioning phase is $Wm1$; in the second mode, in the data writing frame, a total duration of the p signal conditioning phase is $Wd2$, and in the holding frame, a total duration of the q signal conditioning phase is $Wm2$; and $Wd1/Ld1 \neq Wm1/Lm1$ and/or $Wd2/Ld2 \neq Wm2/Lm2$; or in the first mode, in the data writing frame, a duration of a time period between a start of the non-light-emitting period and a start of a first signal conditioning phase is $Tda1$, and in the holding frame, a duration of a time period between the start of the non-light-emitting period and the start of the first signal conditioning phase is $Tma1$; in the second mode, in the data writing frame, the duration of the time period between the start of the non-light-emitting period and the start of the first signal conditioning phase is $Tda2$, and in the holding frame, the duration of the time period between the start of the non-light-emitting period and the start of the first signal conditioning phase is $Tma2$; and $Tda1 \neq Tma1$ and/or $Tad2 \neq Tma2$; or in the first mode, in the data writing frame, a duration of a time period between an end of a last signal conditioning phase and an end of the non-light-emitting period is $Tdb1$, and in the holding frame, a duration of a time period between the end of the last signal conditioning phase and the end of the non-light-emitting period is $Tmb1$; in the second mode, in the data writing frame, a duration of the time period between the end of the last signal conditioning phase and the end of the non-light-emitting period $Tdb2$, and int the holding frame, a duration of the time period between the end of the last signal conditioning phase and the end of the non-light-emitting period is $Tmb2$; and $Tdb1 \neq Tmb1$ and/or $Tdb2 \neq Tmb2$.

2. The display panel according to claim 1, wherein in the first mode, a luminance of the display panel is B1, and in the second mode, a luminance of the display panel is B2, and B1<B2.

3. The display panel according to claim 1, wherein in the first mode, a frame frequency of the image refresh frame of the display panel is Fv1, and in the second mode, a frame frequency of the image refresh frame of the display panel is Fv2, and Fv1<Fv2.

4. The display panel according to claim 1, wherein in the first mode, a duration of the image refresh frame of the display panel is S1, and in the second mode, a duration of the image refresh frame of the display panel is S2, S1>S2.

5. The display panel according to claim 1, further comprising a first pixel circuit and a second pixel circuit, during at least a part of operation of the display panel, the first pixel circuit operates in the first mode, and the second pixel circuit operates in the second mode.

6. The display panel according to claim 5, wherein a data refresh frequency of the first pixel circuit is Fs1, and a data refresh frequency of the second pixel circuit is Fs2, and Fs1≠Fs2.

7. The display panel according to claim 5, further comprising a first display area and a second display area, wherein the first pixel circuit is located in the first display area, and the second pixel circuit is located in the second display area.

8. The display panel according to claim 1, wherein an operation time of the display panel comprises a first time period and a second time period, in the first time period, the pixel circuit operates in the first mode, and in the second time period, the pixel circuit operates in the second mode.

9. The display panel according to claim 1, wherein Ld1=Lm1, and/or, Ld2=Lm2.

10. The display panel according to claim 1, wherein Ld1≠Lm1, and/or, Ld2≠Lm2.

11. The display panel according to claim 10, wherein Ld1>Lm1, and/or, Ld2>Lm2.

12. The display panel according to claim 10, wherein Ld1<Lm1, and/or, Ld2<Lm2.

13. The display panel according to claim 1, wherein Wd1/Ld1>Wm1/Lm1; and/or, Wd2/Ld2>Wm2/Lm2.

14. The display panel according to claim 1, wherein Wd1/Ld1<Wm/Lm1; and/or, Wd2/Ld2<Wm2/Lm2.

15. The display panel according to claim 1, wherein Wd1/Ld1<Wd2/Ld2; and/or, Wm1/Lm1=Wm2/Lm2.

16. The display panel according to claim 1, wherein Wd1/Ld1#Wd2/Ld2; and/or, Wm1/Lm1Wm2/Lm2.

17. The display panel according to claim 16, wherein Wd1/Ld1<Wd2/Ld2; and/or, Wm1/Lm1<Wm2/Lm2.

18. The display panel according to claim 1, wherein the signal conditioning module is a data writing module, and the preset signal is a data signal; the data writing module is connected to a first electrode of the driving transistor, and in the signal conditioning phase, the data writing module is turned on to provide the data signal for the driving transistor; or, wherein the signal conditioning module is a reset module, and the preset signal is a reset signal, the reset module is connected to a gate electrode of the driving transistor, and in the signal conditioning phase, the reset module is turned on to provide a reset signal for the driving transistor; or, wherein the signal conditioning module is a bias conditioning module, and the preset signal is a bias conditioning signal, the bias conditioning module is connected to a first electrode or a second electrode of the driving transistor, and in the signal conditioning phase, the bias conditioning module is turned on to provide the bias conditioning signal for the driving transistor.

19. A display device, comprising:

a display panel, wherein the display panel comprises a pixel circuit and a light-emitting element;

the pixel circuit comprises a driving module and a signal conditioning module;

the driving module comprises a driving transistor;

a frame time of the display panel comprises a non-light-emitting period and a light-emitting period, the non-light-emitting period comprises a signal conditioning phase, and the signal conditioning module is configured to provide a preset signal for the driving transistor in the signal conditioning phase;

an image refresh frame of the pixel circuit comprises a data writing frame and a holding frame, the data writing frame comprises p signal conditioning phases, p≥1, and/or, the holding frame comprises q signal conditioning phases, q≥0;

the pixel circuit is operable in any one of a first mode and a second mode;

in the first mode, a duration of the non-light-emitting period of the data writing frame is Ld1, and a duration of the non-light-emitting period of the holding frame is Lm1;

in the second mode, a duration of the non-light-emitting period of the data writing frame is Ld2, and a duration of the non-light-emitting period of the holding frame is Lm2;

wherein, Ld1>Ld2, and/or, Lm1>Lm2;

wherein in the first mode, in the data writing frame, a total duration of the p signal conditioning phases is Wd1, and in the holding frame, a total duration of the q signal conditioning phase is Wm1; in the second mode, in the data writing frame, a total duration of the p signal conditioning phase is Wd2, and in the holding frame, a total duration of the q signal conditioning, phase is Wm2; and Wd1/Ld1≠Wm1/Lm1 and/or Wd2/Ld2≠Wm2/Lm2; or in the first mode, in the data writing frame, a duration of a time period between a start of the non-light-emitting period and a start of a first signal conditioning phase is Tda1, and in the holding frame, a duration of a time period between the start of the non-light-emitting period and the start of the first signal conditioning phase is Tma1; in the second mode, in the data writing frame, the duration of the time period between the start of the non-light-emitting period and the start of the first signal conditioning phase is Tda1, and in the holding frame, the duration of the time period between the start of the non-light-emitting period and the start of the first signal conditioning phase is Tma2; and Tda1≠Tma1 and/or Tad2≠Tma2; or in the first mode, in the data writing frame, a duration of a time period between an end of a last signal conditioning phase and an end of the non-light-emitting period is Tdb1, and in the holding frame, a duration of a time period between the end of the last signal conditioning phase and the end of the non-light-emitting period is Tmb1; in the second mode, in the data writing frame, a duration of the time period between the end of the last signal conditioning phase and the end of the non-light-emitting period is Tdb2, and in the holding frame, a duration of the time period between the end of the last signal conditioning phase and the end of the non-light-emitting period is Tmb2; and Tdb1≠Tmb1 and/or Tdb2≠Tmb2.

* * * * *